US012566315B2

(12) United States Patent
Niu et al.

(10) Patent No.: US 12,566,315 B2
(45) Date of Patent: Mar. 3, 2026

(54) CAMERA OPTICAL LENS

(71) Applicant: AAC Optics (Suzhou) Co., Ltd., Suzhou City (CN)

(72) Inventors: Wenjing Niu, Shenzhen (CN); Jia Chen, Shenzhen (CN)

(73) Assignee: AAC Optics (Suzhou) Co., Ltd., Suzhou City (CN)

(*) Notice: Subject to any disclaimer, the term of this patent is extended or adjusted under 35 U.S.C. 154(b) by 685 days.

(21) Appl. No.: 17/837,009

(22) Filed: Jun. 9, 2022

(65) Prior Publication Data

US 2023/0185059 A1 Jun. 15, 2023

(30) Foreign Application Priority Data

Dec. 10, 2021 (CN) .......................... 202111509450.X

(51) Int. Cl.
G02B 13/00 (2006.01)
G02B 9/36 (2006.01)
G02B 13/18 (2006.01)

(52) U.S. Cl.
CPC ............. G02B 13/004 (2013.01); G02B 9/36 (2013.01); G02B 13/18 (2013.01)

(58) Field of Classification Search
USPC ..................................................... 359/75, 714
See application file for complete search history.

(56) References Cited

U.S. PATENT DOCUMENTS

| | | | |
|---|---|---|---|
| 2017/0023772 A1* | 1/2017 | Teraoka ............. | G02B 27/0025 |
| 2020/0057246 A1* | 2/2020 | Kenji ................. | G02B 13/0045 |

* cited by examiner

*Primary Examiner* — Dung T Nguyen
(74) *Attorney, Agent, or Firm* — Wiersch Law Group

(57) ABSTRACT

The present disclosure relates to the technical field of optical lens and discloses a camera optical lens satisfying following conditions: $0.50 \leq f12/f \leq 1.20$; $1.50 \leq f4/f \leq 5.00$; $-10.00 \leq R2/R1 \leq -1.20$; where f12 denotes a combined focal length of the first lens and the second lens, f denotes a focal length of the camera optical lens, f4 denotes a focal length of the fourth lens, R2 denotes a central curvature radius of an image-side surface of the first lens, and R1 denotes a central curvature radius of an object-side surface of the first lens. The camera optical lens in the present disclosure satisfies a design requirement of long focal length and ultra-thinness while having good optical functions.

9 Claims, 14 Drawing Sheets

10

10

Longitudinal aberration mm mm

CAMERA OPTICAL LENS

TECHNICAL FIELD

The present disclosure relates to the field of optical lens, in particular, to a camera optical lens suitable for handheld devices, such as smart phones and digital cameras, and imaging devices, such as monitors or PC lenses.

BACKGROUND

In recent years, various smart devices have been developing. There is an increasing desire for minimized camera optical lenses. Pixel sizes of photosensitive devices are being reduced, in addition to a current development trend of electronic products going towards better functions and thinness and portability. As a result, miniature camera optical lenses with good imaging quality is becoming a mainstream in the market. In order to obtain better imaging quality, a multi-lenses lens structure is generally used. In addition, as technologies are improving and there is increasingly varied requirement by users, and in a case where a pixel size of a sensing device is getting smaller and where there is more and more requirement on imaging quality by a system, a four-lenses lens structure is present in a lens design. There is an urgent need for an ultra-thin camera optical lens having outstanding optical features and a long focal length.

SUMMARY

In regard to the above issues, the present disclosure seeks to provide a camera optical lens that satisfies a design requirement of long focal length and ultra-thinness while having good optical functions.

In order to address the above technical issues, some embodiments of the present disclosure provide a camera optical lens, the camera optical lens including: from an object side to an image side, a first lens having a positive refractive power; a second lens having a negative refractive power; a third lens having a negative refractive power; and a fourth lens having a positive refractive power; wherein the camera optical lens satisfies following conditions:

$$0.50 \leq f12/f \leq 1.20;$$

$$1.50 \leq f4/f \leq 5.00;$$

$$-10.00 \leq R2/R1 \leq -1.20;$$

where f12 denotes a combined focal length of the first lens and the second lens; f denotes a focal length of the camera optical lens; f4 denotes focal length of the fourth lens; R2 denotes a central curvature radius of an image-side surface of the first lens; and R1 denotes a central curvature radius of an object-side surface of the first lens.

Preferably, the camera optical lens further satisfies the following condition:

$$-2.00 \leq f3/f \leq -0.50;$$

where f3 denotes a focal length of the third lens.

Preferably, the camera optical lens further satisfies the following condition:

$$1.00 \leq d4/d5 \leq 5.00;$$

where d4 denotes an on-axis distance from an image-side surface of the second lens to an object-side surface of the third lens, and d5 denotes an on-axis thickness of the third lens.

Preferably, the camera optical lens further satisfies the following conditions:

$$(R7+R8)/(R7-R8) \leq -2.00;$$

where R7 denotes a central curvature radius of an object-side surface of the fourth lens, and R8 denotes a central curvature radius of an image-side surface of the fourth lens.

Preferably, the camera optical lens further satisfies the following conditions:

$$0.16 \leq f1/f \leq 0.63; \text{ and}$$

$$0.06 \leq d1/TTL \leq 0.24;$$

where an object-side surface of the first lens close to an axis is convex and an image-side surface of the first lens close to the axis is convex, f1 denotes a focal length of the first lens, d1 denotes an on-axis thickness of the first lens, and TTL denotes a total optical length from an object-side surface of the first lens to an image surface of the camera optical lens along an optical axis.

Preferably, the camera optical lens further satisfies the following conditions:

$$-1.74 \leq f2/f \leq -0.32;$$

$$-5.95 \leq (R3+R4)/(R3-R4) \leq 1.33; \text{ and}$$

$$0.02 \leq d3/TTL \leq 0.14;$$

where an object-side surface of the second lens close to an axis is concave, f2 denotes a focal length of the second lens, R3 denotes a central curvature radius of the object-side surface of the second lens, R4 denotes a central curvature radius of an image-side surface of the second lens, d3 denotes an on-axis thickness of the second lens, and TTL denotes a total optical length from an object-side surface of the first lens to an image surface of the camera optical lens along an optical axis.

Preferably, the camera optical lens further satisfies the following conditions:

$$-3.62 \leq (R5+R6)/(R5-R6) \leq 4.97; \text{ and}$$

$$0.02 \leq d5/TTL \leq 0.14;$$

where R5 denotes a central curvature radius of an object-side surface of the third lens, R6 denotes a central curvature radius of an image-side surface of the third lens, d5 denotes an on-axis thickness of the third lens, and TTL denotes a total optical length from an object-side surface of the first lens to an image surface of the camera optical lens along an optical axis.

Preferably, the camera optical lens further satisfies the following conditions:

$$0.02 \leq d7/TTL \leq 0.16;$$

where an object-side surface of the fourth lens close to an axis is convex and an image-side surface of the fourth lens close to the axis is concave, d7 denotes an on-axis thickness of the fourth lens, and TTL denotes a total optical length from an object-side surface of the first lens to an image surface of the camera optical lens along an optical axis.

Preferably, the camera optical lens further satisfies the following conditions:

$$TTL/IH \leq 5.42; \text{ and}$$

$$f/IH \geq 5.70;$$

where TTL denotes a total optical length from an object-side surface of the first lens to an image surface of the camera optical lens along an optical axis, and IH denotes an image height of the camera optical lens.

The present disclosure is advantageous in: the camera optical lens in the present disclosure has good optical functions and has characteristics of long focal length and ultra-thinness, and is especially fit for WEB camera lenses and mobile phone camera lens assemblies composed by such camera elements as CCD and CMOS for high pixels.

BRIEF DESCRIPTION OF DRAWINGS

In order to describe the technical solution in the embodiments of the present disclosure more clearly, the drawings corresponding to the embodiments will be described in the following. Evidently, the drawings described in the following are only some embodiments of the present disclosure. For those skilled in the art, other drawings may be obtained based in the drawings without any inventive effort.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
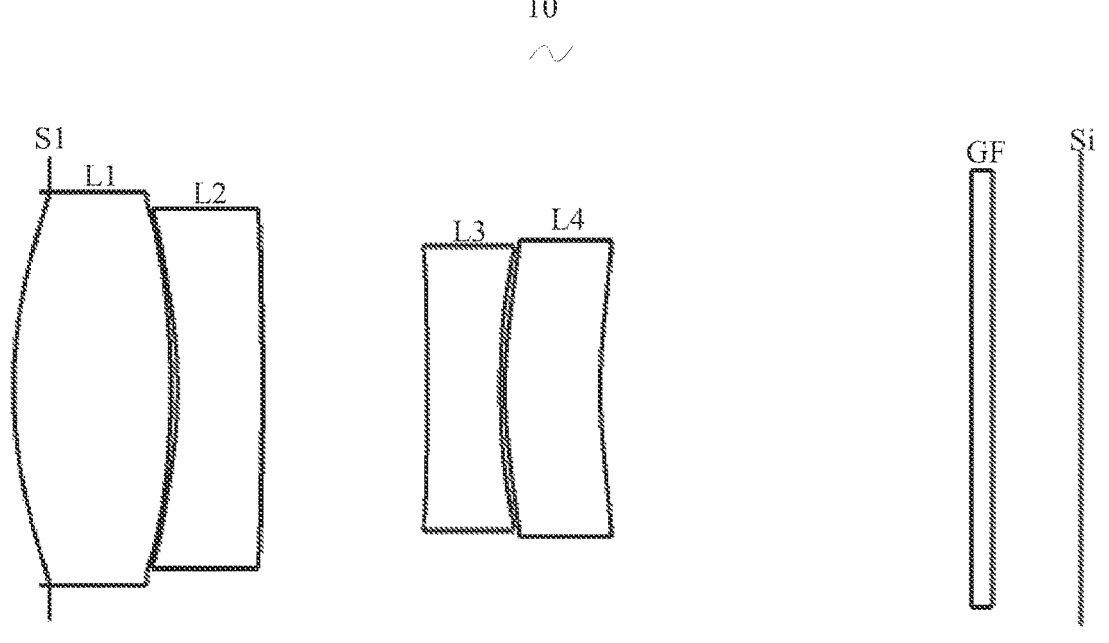
FIG. 1 is a schematic diagram of a structure of a camera optical lens according to Embodiment 1 of the present disclosure.

With reference to the drawings, the present disclosure provides a camera optical lens 10. FIG. 1 shows the camera optical lens 10 of Embodiment 1 of the present disclosure, the camera optical lens 10 includes four lenses. Specifically, the camera optical lens 10 includes, from an object side to an image side: an aperture S1, a first lens L1, a second lens L2, a third lens L3 and a fourth lens L4. In this embodiment, an optical element such as an optical filter GF is arranged between the fourth lens L4 and an image surface Si.

In this embodiment, the first lens L1 is a plastic material, the second lens L2 is a plastic material, the third lens L3 is a plastic material and the fourth lens L4 is a plastic material. In an alternative embodiment, lenses may be other materials.

In this embodiment, a combined focal length of the first lens L1 and second lens L2 is defined as f12, a focal length of the camera optical lens 10 is defined as f, and the camera optical lens 10 satisfies the following condition: $0.50 \le f12/f \le 1.20$. By prescribing a ratio between the combined focal length f12 of the first lens L1 and second lens L2 and the focal length f of the camera optical lens 10, a field curvature quantity of a system may be effectively balanced so that a field curvature bias quantity of a central field is less than 10 μm.

A focal length of the fourth lens L4 is defined as f4, the focal length of the camera optical lens 10 is defined as f, and the camera optical lens 10 satisfies the following condition: $1.50 \le f4/f \le 5.00$. By prescribing a ratio between the focal length f4 of the fourth lens L4 and the focal length f of the camera optical lens 10 and reasonable distribution of focal lengths, the system has good imaging quality and low sensitivity.

A central curvature radius of an image-side surface of the first lens L1 is defined as R2, a central curvature radius of an object-side surface of the first lens L1 is defined as R1, and the camera optical lens 10 satisfies the following condition: $-10.00 \leq R2/R1 \leq -1.20$. By prescribing a shape of the first lens L1, refraction of light is reduced and chromatic aberration is effectively reduced. The chromatic aberration is thus $|LC| \leq 1.5$ μm.

A focal length of the third lens L3 is defined as f3, the focal length of the camera optical lens 10 is defined as f, and the camera optical lens 10 satisfies the following condition: $-2.00 \leq f3/f \leq -0.50$. By prescribing a ratio between the focal length f3 of the third lens L3 and the focal length f of the camera optical lens 10 and reasonable distribution of focal lengths, the system has good imaging quality and low sensitivity.

An on-axis distance from an image-side surface of the second lens L2 to an object-side surface of the third lens L3 is defined as d4, an on-axis thickness of the third lens is defined as d5, and the camera optical lens 10 satisfies the following condition: $1.00 \leq d4/d5 \leq 5.00$. By prescribing a ratio between the on-axis distance d4 from the image-side surface of the second lens L2 to an object-side surface of the third lens L3 and the on-axis thickness d5 of the third lens L3, and within a range of the condition, it helps to shorten a total optical length from the object-side surface of the first lens L1 to the image surface Si of the camera optical lens 10 along an optical axis (TTL), so as to achieve ultra-thinness.

A central curvature radius of an object-side surface of the fourth lens L4 is defined as R7, a central curvature radius of an image-side surface of the fourth lens L4 is defined as R8, and the camera optical lens 10 satisfies the following condition: $(R7+R8)/(R7-R8) \leq -2.00$. By prescribing a shape of the fourth lens L4, it is advantageous for correcting astigmatism and distortion of the camera optical lens 10, so that |Distortion| ≤ 1% and possibility of generation of a dark corner is reduced.

In this embodiment, an object-side surface of the first lens L1 close to an axis is convex and an image-side surface of the first lens L1 close to the axis is convex. The first lens L1 has a positive refractive power. In an alternative embodiment, the object-side surface and the image-side surface of the first lens L1 may further be arranged in another way in terms of convex and concave conditions.

A focal length of the first lens L1 is denoted as f1, the focal length of the camera optical lens 10 is defined as f, and the camera optical lens 10 satisfies the following condition: $0.16 \leq f1/f \leq 0.63$. By prescribing a ratio between the focal length f1 of the first lens L1 and the focal length f of the camera optical lens 10 and within the range of the condition, the first lens L1 has an appropriate positive refractive power that is advantageous for reducing the aberration of the system and ultra-thinness of lenses. Preferably, the camera optical lens 10 satisfies the following condition: $0.25 \leq f1/f \leq 0.51$.

An on-axis thickness of the first lens L1 is defined as d1, the total optical length of the camera optical lens 10 is defined as TTL, and the camera optical lens 10 satisfies the following condition: $0.06 \leq d1/TTL \leq 0.24$. Within a range of the condition, it is advantageous for achieving ultra-thinness. Preferably, the camera optical lens 10 satisfies the following condition: $0.10 \leq d1/TTL \leq 0.19$.

In this embodiment, an object-side surface of the second lens L2 close to the axis is concave, while an image-side surface of the second lens L2 close to the axis is convex. The second lens L2 has a negative refractive power. In an alternative embodiment, the object-side surface and the image-side surface of the second lens L2 may further be arranged in another way in terms of convex and concave conditions.

A focal length of the second lens L2 is denoted as f2, the focal length of the camera optical lens 10 is defined as f, and the camera optical lens 10 satisfies the following condition: $-1.74 \leq f2/f \leq -0.32$. By prescribing a ratio between the focal length f2 of the second lens L2 and the focal length f of the camera optical lens 10, and within a range of the condition, it is advantageous for correcting aberration of the optical system by controlling the negative focal power of the second lens L2 within a reasonable range. Preferably, the camera optical lens 10 satisfies the following condition: $-1.09 \leq f2/f \leq -0.39$.

A central curvature radius of the object-side surface of the second lens L2 is defined as R3, a central curvature radius of an image-side surface of the second lens L2 is defined as R4, and the camera optical lens 10 satisfies the following condition: $-5.95 \leq (R3+R4)/(R3-R4) \leq 1.33$. By prescribing a shape of the second lens L2, within a range of the condition, and as lenses are developing to become ultra-thin, this is advantageous for correcting an on-axis aberration. Preferably, the camera optical lens 10 satisfies the following condition: $-3.72 \leq (R3+R4)/(R3-R4) \leq 1.07$.

An on-axis thickness of the second lens L2 is defined as d3, the total optical length of the camera optical lens 10 is defined as TTL, and the camera optical lens 10 satisfies the following condition: $0.02 \leq d3/TTL \leq 0.14$. Within a range of the condition, this is advantageous for achieving ultra-thinness. Preferably, the camera optical lens 10 satisfies the following condition: $0.03 \leq d3/TTL \leq 0.11$.

In this embodiment, an object-side surface of the third lens L3 close to the axis is concave, and an image-side surface of the third lens L3 close to the axis is concave. The third lens L3 has a negative refractive power. In an alternative embodiment, the object-side surface and the image-side surface of the third lens L3 may further be arranged in another way in terms of convex and concave conditions.

A central curvature radius of the object-side surface of the third lens L3 is defined as R5, a central curvature radius of an image-side surface of the third lens L3 is defined as R6, and the camera optical lens 10 satisfies the following condition: $-3.62 \leq (R5+R6)/(R5-R6) \leq 4.97$. In this way, a shape of the third lens L3 may be effectively controlled, which is advantageous for forming the third lens L3. This may reduce refraction of light passing through the lenses and man reduce chromatic aberration. Preferably, the camera optical lens 10 satisfies the following condition: $-2.26 \leq (R5+R6)/(R5-R6) \leq 3.98$.

An on-axis thickness of the third lens L3 is defined as d5, the total optical length of the camera optical lens 10 is defined as TTL, and the camera optical lens 10 satisfies the following condition: $0.02 \leq d5/TTL \leq 0.14$. Within a range of the condition, this is advantageous for achieving ultra-thinness. Preferably, the camera optical lens 10 satisfies the following condition: $0.03 \leq d5/TTL \leq 0.11$.

In this embodiment, an object-side surface of the fourth lens L4 close to the axis is convex, and an image-side surface of the fourth lens L4 close to the axis is concave. The fourth lens L4 has a positive refractive power. In an alternative embodiment, the object-side surface and the image-side surface of the fourth lens L4 may further be arranged in another way in terms of convex and concave conditions.

An on-axis thickness of the fourth lens L4 is defined as d7, the total optical length of the camera optical lens 10 is defined as TTL, and the camera optical lens 10 satisfies the following condition: $0.02 \leq d7/TTL \leq 0.16$. Within a range of the condition, this is advantageous for achieving ultra-thinness. Preferably, the camera optical lens 10 satisfies the following condition: $0.04 \leq d7/TTL \leq 0.13$.

In this embodiment, the total optical length of the camera optical lens 10 is defined as TTL, an image height of the camera optical lens 10 is defined as IH, and the camera optical lens 10 satisfies the following condition: TTL/IH≤5.42 and f/IH≥5.70. This is advantageous for achieving long focal length and ultra-thinness.

That is, when the focal length of the camera optical lens 10, focal lengths and curvature radiuses of each lens satisfy the above conditions, the camera optical lens 10 has good optical functions and may satisfy the design requirement of long focal length and ultra-thinness. According to the characteristics of the camera optical lens 10, the camera optical lens 10 is especially fit for WEB camera lenses and mobile phone camera lens assemblies composed by such camera elements as CCD and CMOS for high pixels.

In the following, examples will be used to describe the camera optical lens 10 of the present disclosure. The symbols recorded in each example will be described as follows. The focal length, on-axis distance, central curvature radius, on-axis thickness, inflexion point position, and arrest point position are all in units of mm.

TTL: a total optical length (a total optical length from the object-side surface of the first lens L1 to the image surface Si of the camera optical lens 10 along an optical axis) in mm.

Aperture value FNO: a ratio between an entrance pupil diameter and a valid focal length of the camera optical length.

Preferably, inflexion points and/or arrest points can be arranged on the object-side surface and/or the image-side surface of the lens, so as to satisfy the demand for high quality imaging. The description below can be referred to for specific implementations.

Table 1 and Table 2 show design data of the camera optical lens 10 in Embodiment 1 of the present disclosure.

TABLE 1

|  | R | d |  | nd |  | vd |
|---|---|---|---|---|---|---|
| S1 | ∞ | d0 = | −0.370 |  |  |  |
| R1 | 3.493 | d1 = | 1.630 | nd1 | 1.5444 | v1 55.82 |
| R2 | −5.152 | d2 = | 0.069 |  |  |  |
| R3 | −3.134 | d3 = | 0.880 | nd2 | 1.6153 | v2 25.94 |
| R4 | −11.329 | d4 = | 1.704 |  |  |  |
| R5 | −11.280 | d5 = | 0.750 | nd3 | 1.5444 | v3 55.82 |
| R6 | 7.692 | d6 = | 0.050 |  |  |  |
| R7 | 3.580 | d7 = | 0.980 | nd4 | 1.6610 | v4 20.53 |
| R8 | 3.867 | d8 = | 3.842 |  |  |  |
| R9 | ∞ | d9 = | 0.210 | ndg | 1.5168 | vg 64.17 |
| R10 | ∞ | d10 = | 0.925 |  |  |  |

Herein, meanings of various symbols will be described as follows.

S1: aperture;

R: curvature radius at a center of an optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the optical filter GF;

R10: central curvature radius of the image-side surface of the optical filter GF;

d: on-axis thickness of a lens or on-axis distance between neighboring lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the optical filter GF;

d9: on-axis thickness of the optical filter GF;

d10: on-axis distance from the image-side surface of the optical filter GF to the image surface Si;

nd: refractive index of the d line (the d line is green light having a wavelength of 550 nm);

nd1: refractive index of the d line of the first lens L1;

nd2: refractive index of the d line of the second lens L2;

nd3: refractive index of the d line of the third lens L3;

nd4: refractive index of the d line of the fourth lens L4;

ndg: refractive index of the d line of the optical filter GF;

vd: abbe number;

v1: abbe number of the first lens L1;

v2: abbe number of the second lens L2;

v3: abbe number of the third lens L3;

v4: abbe number of the fourth lens L4;

vg: abbe number of the optical filter GF.

Table 2 shows aspheric surface data of lenses of the camera optical lens 10 in Embodiment 1 of the present disclosure.

TABLE 2

|  | Conic coefficient | Aspheric surface coefficients |  |  |  |  |
|---|---|---|---|---|---|---|
|  | k | A4 | A6 | A8 | A10 | A12 |
| R1 | 7.8213E−01 | −6.8316E−03 | −7.0974E−04 | −1.0048E−03 | 1.1105E−03 | −8.4782E−04 |
| R2 | −1.0090E+01 | 9.8306E−03 | −1.9286E−02 | 1.4020E−02 | 3.3538E−04 | −1.0381E−02 |
| R3 | −1.7269E+01 | −9.8677E−03 | 1.5071E−02 | −1.8008E−02 | 2.3360E−02 | −2.3432E−02 |

TABLE 2-continued

| | | | | | |
|---|---|---|---|---|---|
| R4 | −6.5115E+01 | 2.9232E−02 | −1.7781E−02 | 1.3736E−02 | −1.4583E−02 | 1.0561E−02 |
| R5 | −7.6779E+00 | 6.1516E−02 | −5.8464E−02 | 1.9180E−02 | 4.1559E−02 | −1.3021E−01 |
| R6 | 2.6096E+01 | 1.0040E−01 | −2.4607E−01 | 5.3939E−01 | −8.7721E−01 | 1.0016E+00 |
| R7 | 1.6383E−01 | −6.2455E−03 | −1.6169E−01 | 4.4568E−01 | −7.7068E−01 | 9.2909E−01 |
| R8 | −5.9355E+01 | 7.1917E−02 | −2.0167E−01 | 3.7432E−01 | −5.2926E−01 | 5.4314E−01 |

| | Conic coefficient | Aspheric surface coefficients | | | |
|---|---|---|---|---|---|
| | k | A14 | A16 | A18 | A20 |
| R1 | 7.8213E−01 | 3.9447E−04 | −1.1135E−04 | 1.7354E−05 | −1.1562E−06 |
| R2 | −1.0090E+01 | 8.4865E−03 | −3.2508E−03 | 6.3425E−04 | −5.0910E−05 |
| R3 | −1.7269E+01 | 1.4153E−02 | −4.9847E−03 | 9.5604E−04 | −7.7422E−05 |
| R4 | −6.5115E+01 | −4.7616E−03 | 1.2301E−03 | −1.5017E−04 | 4.4204E−06 |
| R5 | −7.6779E+00 | 1.7302E−01 | −1.2936E−01 | 5.2615E−02 | −9.0372E−03 |
| R6 | 2.6096E+01 | −7.9702E−01 | 4.0763E−01 | −1.1630E−01 | 1.3687E−02 |
| R7 | 1.6383E−01 | −7.7052E−01 | 4.0655E−01 | −1.1991E−01 | 1.4834E−02 |
| R8 | −5.9355E+01 | −3.8382E−01 | 1.7520E−01 | −4.6186E−02 | 5.3164E−03 |

For convenience, the non-spheres in each lens are ones represented by the following formula (1), but the present disclosure is not limited to this formula.

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20} \quad (1)$$

Herein, k is a conic coefficient, A4, A6, A8, A10, A12, A14, A16, A18 and A20 are aspheric surface coefficients, c is curvature radius at the center of the optical surface, r is a vertical distance between a point on an aspheric surface curve and an optical axis and z is an aspheric depth (a vertical distance between a point of a distance of r from the optical axis and a tangent plane tangent to a top point of the optical axis of the aspheric surface).

Table 3 and Table 4 show design data of inflexion points and arrest points of the camera optical lens 10 according to Embodiment 1 of the present disclosure. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4. The data in the column named "inflexion point position" refer to vertical distances from inflexion points arranged on each lens surface to the optical axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 |
|---|---|---|---|
| P1R1 | 1 | 1.555 | / |
| P1R2 | 0 | / | / |
| P2R1 | 0 | / | / |
| P2R2 | 2 | 0.555 | 1.015 |
| P3R1 | 2 | 0.445 | 0.655 |
| P3R2 | 1 | 1.005 | / |
| P4R1 | 1 | 0.905 | / |
| P4R2 | 2 | 0.815 | 1.285 |

TABLE 4

| | Number(s) of arrest points |
|---|---|
| P1R1 | 0 |
| P1R2 | 0 |
| P2R1 | 0 |
| P2R2 | 0 |
| P3R1 | 0 |
| P3R2 | 0 |
| P4R1 | 0 |
| P4R2 | 0 |

Figure 2:
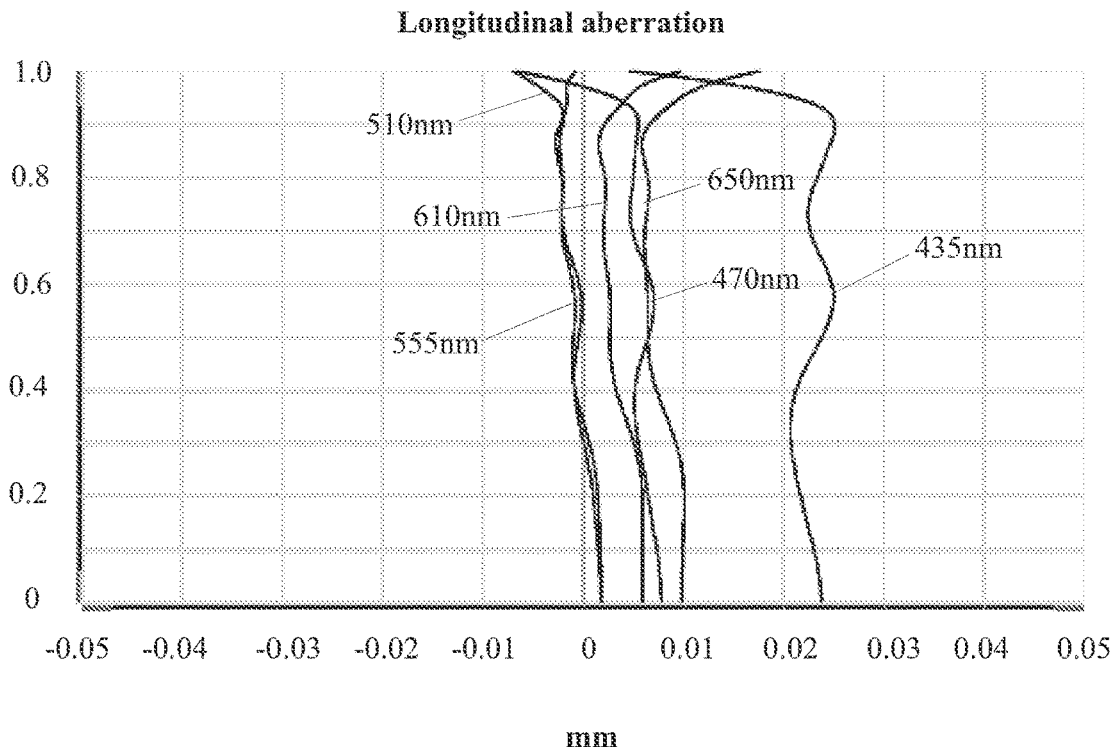
FIG. 2 is a schematic diagram of a longitudinal aberration of the camera optical lens shown in FIG. 1.
Figure 3:
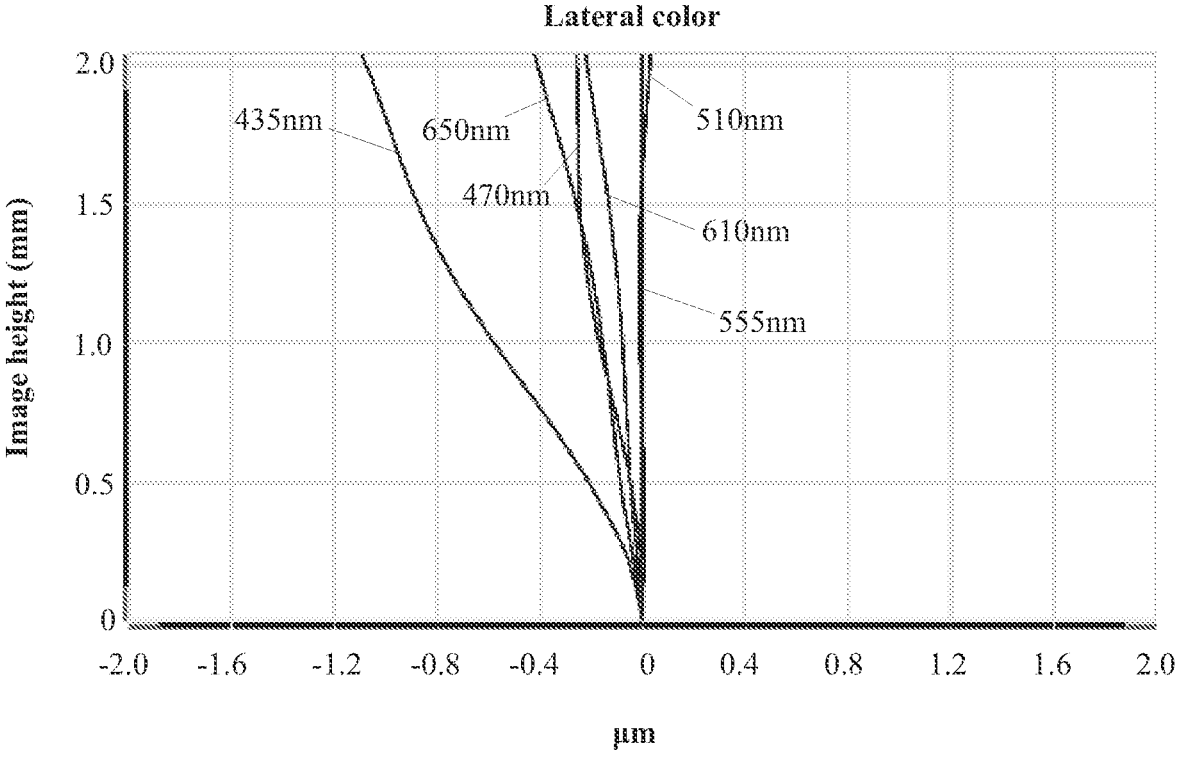
FIG. 3 is a schematic diagram of a lateral color of the camera optical lens shown in FIG. 1.
Figure 4:
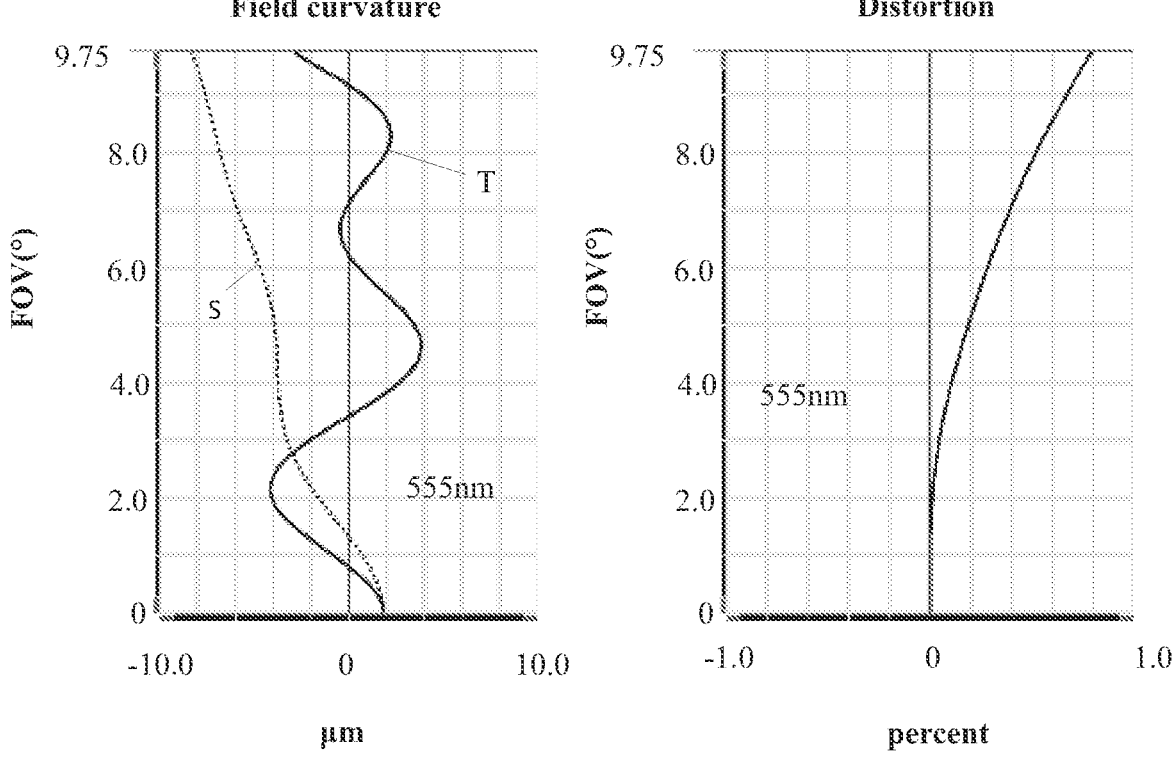
FIG. 4 is a schematic diagram of a field curvature and a distortion of the camera optical lens shown in FIG. 1.

FIG. 2 and FIG. 3 illustrate a longitudinal aberration and a lateral color with wavelengths of 435 nm, 470 nm, 510 nm, 555 nm, 610 nm and 650 nm after passing the camera optical lens 10 according to Embodiment 1, respectively. FIG. 4 illustrates a field curvature and a distortion with a wavelength of 555 nm after passing the camera optical lens 10 according to Embodiment 1. A field curvature S in FIG. 4 is a field curvature in a sagittal direction, and T is a field curvature in a tangential direction.

Table 29 in the following text shows values of various values in Embodiments 1, 2, 3, 4, 5 and 6 corresponding to the parameters prescribed in the conditions.

As shown in Table 29, Embodiment 1 satisfies the conditions.

In this embodiment, an entrance pupil diameter of the camera optical lens 10 is 3.400 mm, an image height of 1.0H is 2.040 mm, a FOV (field of view) in a diagonal direction is 19.50°, so that the camera optical lens 10 satisfies the design requirement of long focal length and ultra-thinness. Its on-axis and off-axis aberrations are fully corrected, thereby achieving excellent optical characteristics.

Embodiment 2

Figure 5:
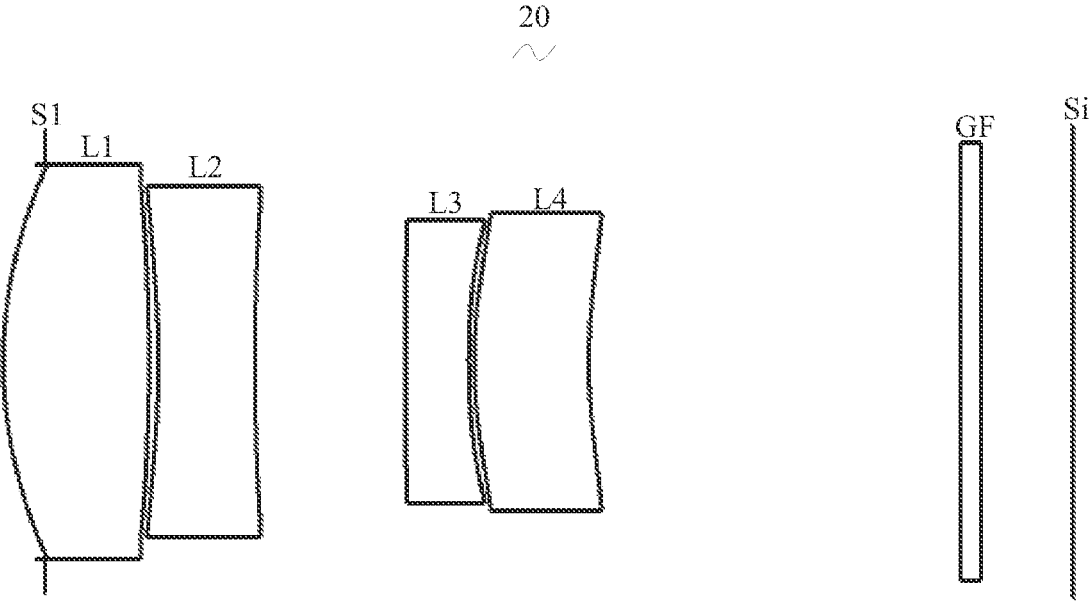
FIG. 5 is a schematic diagram of a structure of a camera optical lens according to Embodiment 2 of the present disclosure.

Embodiment 2 is basically the same as Embodiment 1 and involves symbols having the same meanings as Embodiment 1, a structure of a camera optical lens 20 according to Embodiment 2 of the present disclosure is shown in FIG. 5, and only differences therebetween will be described in the following.

In Embodiment 2, an image-side surface of a second lens L2 close to an axis is concave.

Table 5 and Table 6 show design data of the camera optical lens 20 in Embodiment 2 of the present disclosure.

TABLE 5

| | R | d | | nd | | vd | |
|---|---|---|---|---|---|---|---|
| S1 | ∞ | d0 = | −0.426 | | | | |
| R1 | 3.195 | d1 = | 1.503 | nd1 | 1.5444 | v1 | 55.82 |
| R2 | −14.090 | d2 = | 0.100 | | | | |
| R3 | −6.442 | d3 = | 0.998 | nd2 | 1.6400 | v2 | 23.54 |
| R4 | 29.810 | d4 = | 1.553 | | | | |
| R5 | −29.179 | d5 = | 0.656 | nd3 | 1.5444 | v3 | 55.82 |
| R6 | 7.564 | d6 = | 0.054 | | | | |
| R7 | 3.451 | d7 = | 1.183 | nd4 | 1.6610 | v4 | 20.53 |
| R8 | 3.761 | d8 = | 3.842 | | | | |
| R9 | ∞ | d9 = | 0.210 | ndg | 1.5168 | vg | 64.17 |
| R10 | ∞ | d10 = | 0.951 | | | | |

Table 6 shows aspheric surface data of lenses in the camera optical lens 20 in Embodiment 2.

TABLE 6

| | Conic coefficient | Aspheric surface coefficients | | | | |
|---|---|---|---|---|---|---|
| | K | A4 | A6 | A8 | A10 | A12 |
| R1 | 8.2571E−01 | −5.8435E−03 | −3.9571E−03 | 6.1007E−03 | −5.4417E−03 | 2.4167E−03 |
| R2 | −1.0843E+01 | 2.7785E−02 | −1.5124E−01 | 3.7200E−01 | −4.9310E−01 | 3.8450E−01 |
| R3 | −3.3670E+01 | 3.0882E−02 | −1.4917E−01 | 3.7605E−01 | −5.1885E−01 | 4.2304E−01 |
| R4 | −9.8938E+01 | 2.7064E−02 | −5.4051E−02 | 1.3391E−01 | −2.2818E−01 | 2.3868E−01 |
| R5 | 3.8740E+01 | 8.1156E−02 | −1.5587E−01 | 3.7880E−01 | −7.8733E−01 | 1.1164E+00 |
| R6 | 2.5454E+01 | 1.3737E−01 | −5.4745E−01 | 1.7164E+00 | −3.5940E+00 | 4.9759E+00 |
| R7 | 6.2607E−01 | 2.2700E−02 | −3.8378E−01 | 1.3326E+00 | −2.8443E+00 | 3.9446E+00 |
| R8 | −4.4340E+01 | 6.1575E−02 | −1.6122E−01 | 3.2356E−01 | −5.1576E−01 | 5.8571E−01 |

| | Conic coefficient | Aspheric surface coefficients | | | |
|---|---|---|---|---|---|
| | k | A14 | A16 | A18 | A20 |
| R1 | 8.2571E−01 | −4.7544E−04 | −1.4308E−05 | 2.0690E−05 | −2.3548E−06 |
| R2 | −1.0843E+01 | −1.8234E−01 | 5.1711E−02 | −8.0537E−03 | 5.2908E−04 |
| R3 | −3.3670E+01 | −2.1020E−01 | 6.2566E−02 | −1.0246E−02 | 7.0932E−04 |
| R4 | −9.8938E+01 | −1.5369E−01 | 5.9400E−02 | −1.2614E−02 | 1.1286E−03 |
| R5 | 3.8740E+01 | −1.0295E+00 | 5.8409E−01 | −1.8357E−01 | 2.4274E−02 |
| R6 | 2.5454E+01 | −4.4672E+00 | 2.4724E+00 | −7.6096E−01 | 9.9138E−02 |
| R7 | 6.2607E−01 | −3.5110E+00 | 1.9167E+00 | −5.8094E−01 | 7.4594E−02 |
| R8 | −4.4340E+01 | −4.4430E−01 | 2.1177E−01 | −5.7084E−02 | 6.6227E−03 |

Table 7 and table 8 show design data of inflexion points and arrest points of each lens of the camera optical lens 20 lens according to Embodiment 2 of the present disclosure.

TABLE 7

| | Number(s) of inflexion points | Inflexion point position 1 | Inflexion point position 2 |
|---|---|---|---|
| P1R1 | 0 | / | / |
| P1R2 | 1 | 1.485 | / |
| P2R1 | 1 | 1.395 | / |
| P2R2 | 1 | 1.195 | / |
| P3R1 | 2 | 0.215 | 0.865 |
| P3R2 | 1 | 1.155 | / |
| P4R1 | 1 | 1.135 | / |
| P4R2 | 2 | 0.905 | 1.305 |

TABLE 8

| | Number of arrest points | Arrest point position 1 | Arrest point position 2 |
|---|---|---|---|
| P1R1 | 0 | / | / |
| P1R2 | 0 | / | / |

TABLE 8-continued

| | Number of arrest points | Arrest point position 1 | Arrest point position 2 |
|---|---|---|---|
| P2R1 | 0 | / | / |
| P2R2 | 0 | / | / |
| P3R1 | 2 | 0.385 | 1.095 |
| P3R2 | 0 | / | / |
| P4R1 | 0 | / | / |
| P4R2 | 0 | / | / |

Figure 6:
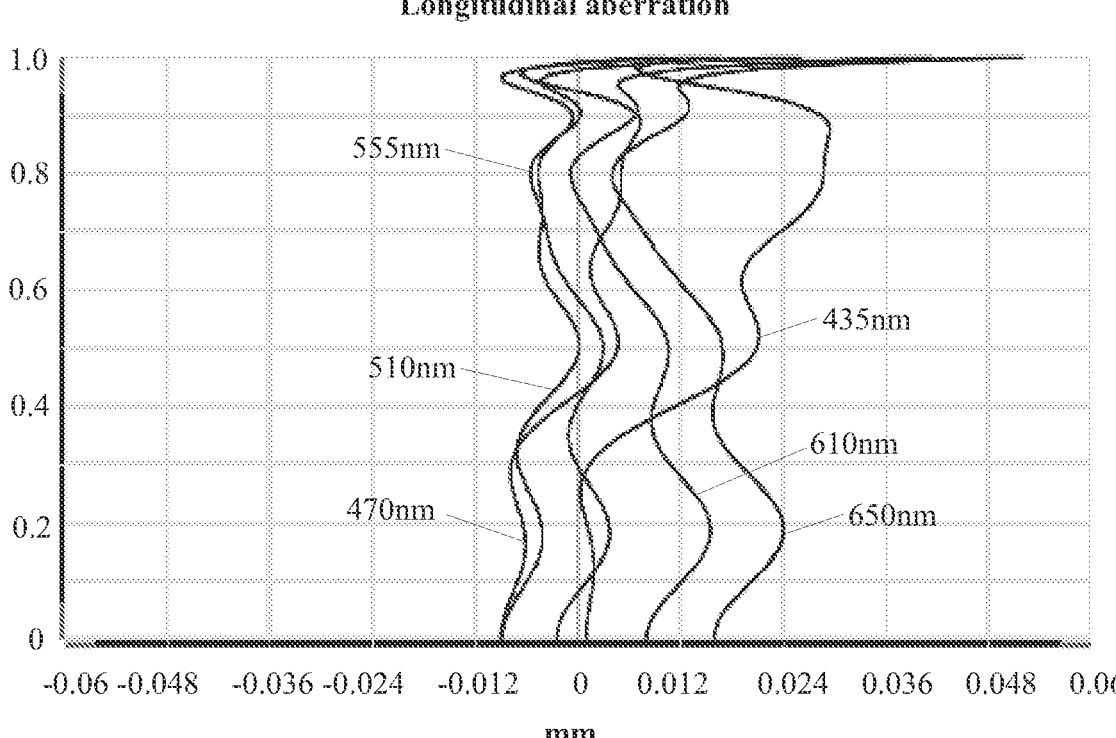
FIG. 6 is a schematic diagram of a longitudinal aberration of the camera optical lens shown in FIG. 5.
Figure 7:
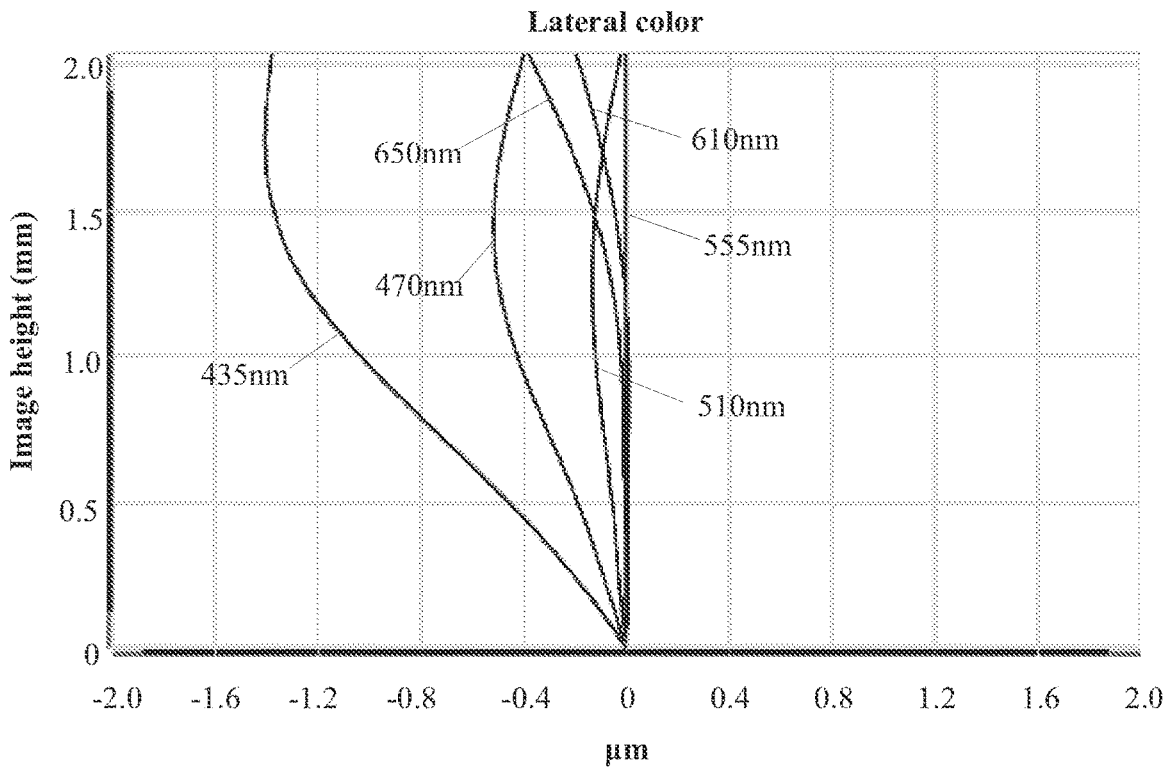
FIG. 7 is a schematic diagram of a lateral color of the camera optical lens shown in FIG. 5.
Figure 8:
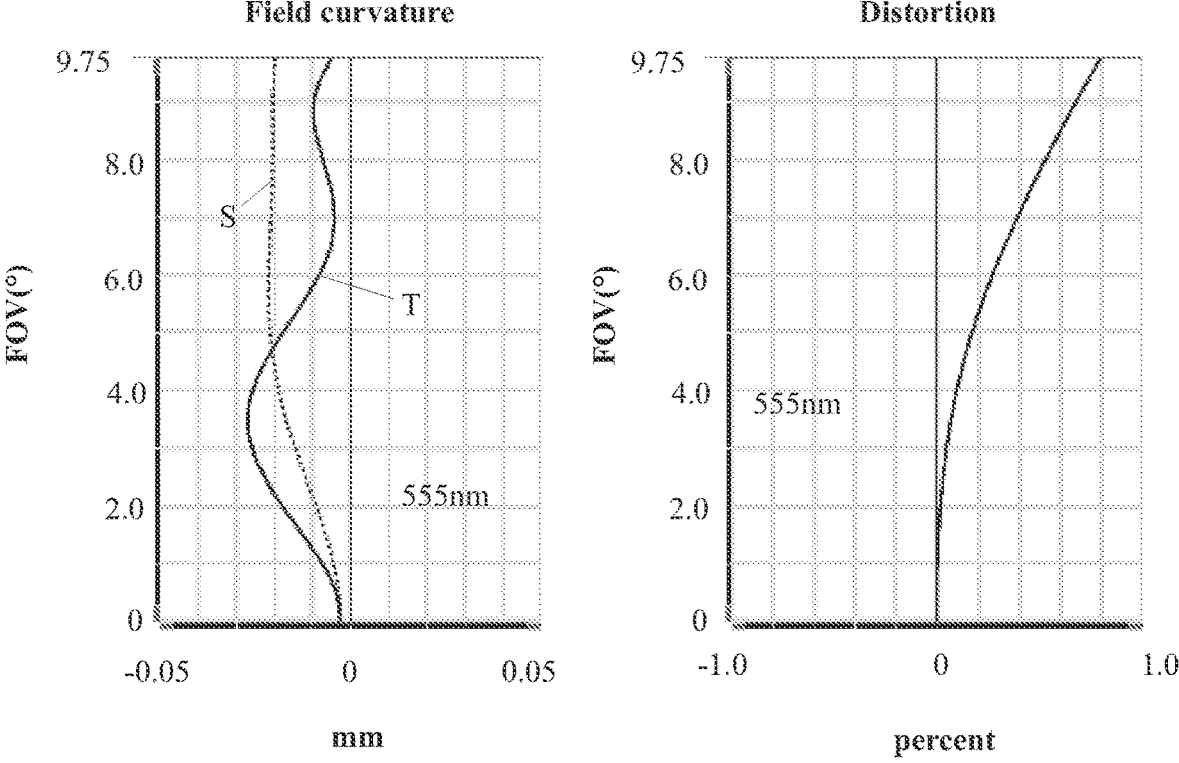
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 435 nm, 470 nm, 510 nm, 555 nm, 610 nm and 650 nm after passing the camera optical lens 20 according to Embodiment 2. FIG. 8 illustrates a field curvature and a distortion of light with a wavelength of 555 nm after passing the camera optical lens 20 according to Embodiment 2. A field curvature S in FIG. 8 is a field curvature in a sagittal direction, and T is a field curvature in a tangential direction.

As shown in Table 29, Embodiment 2 satisfies the conditions.

In this embodiment, an entrance pupil diameter ENPD of the camera optical lens 20 is 3.400 mm, an image height IH of 1.0H is 2.040 mm, a FOV (field of view) in the diagonal direction is 19.50°. Thus, the camera optical lens 20 satisfies the design requirement of long focal length and ultra-thinness. Its on-axis and off-axis aberrations are fully corrected, thereby achieving excellent optical characteristics.

Embodiment 3

Figure 9:
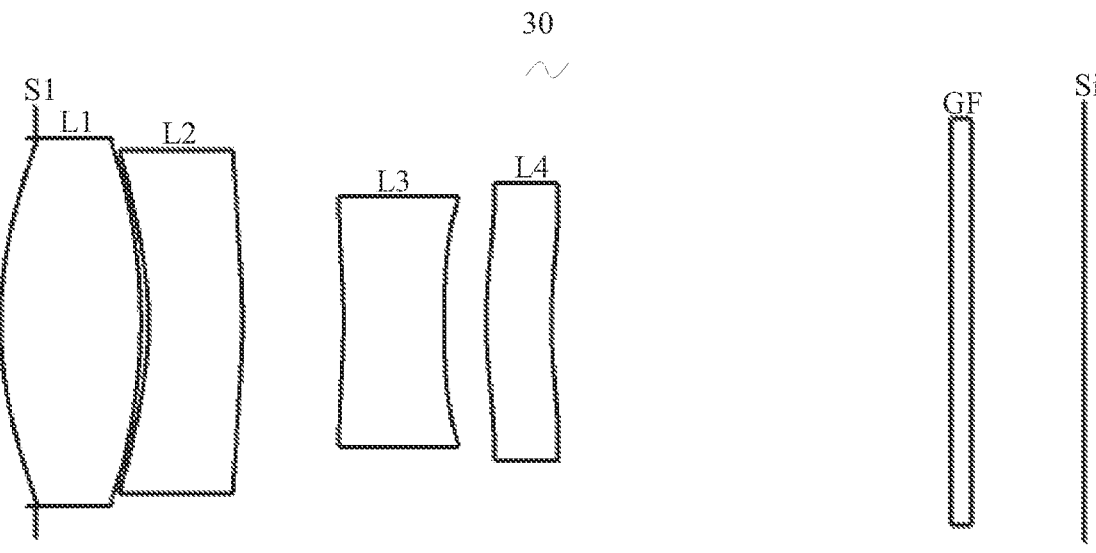
FIG. 9 is a schematic diagram of a structure of a camera optical lens according to Embodiment 3 of the present disclosure.

Embodiment 3 is basically the same as Embodiment 1 and involves symbols having the same meanings as Embodiment 1. A structure of a camera optical lens 30 according to Embodiment 3 of the present disclosure is shown in FIG. 9. Only differences therebetween will be described in the following.

Table 9 and Table 10 show design data of the camera optical lens 30 in Embodiment 3 of the present disclosure.

TABLE 9

| | R | d | | nd | | vd |
|---|---|---|---|---|---|---|
| S1 | ∞ | d0= | −0.352 | | | |
| R1 | 3.492 | d1= | 1.427 | nd1 | 1.5444 v1 | 55.82 |
| R2 | −4.212 | d2= | 0.080 | | | |
| R3 | −2.793 | d3= | 0.954 | nd2 | 1.6153 v2 | 25.94 |
| R4 | −5.623 | d4= | 1.033 | | | |
| R5 | −4.657 | d5= | 1.024 | nd3 | 1.5444 v3 | 55.82 |
| R6 | 11.663 | d6= | 0.428 | | | |
| R7 | 4.070 | d7= | 0.666 | nd4 | 1.6610 v4 | 20.53 |
| R8 | 4.243 | d8= | 4.072 | | | |
| R9 | ∞ | d9= | 0.210 | ndg | 1.5168 vg | 64.17 |
| R10 | ∞ | d10= | 1.146 | | | |

Table 10 shows aspheric surface data of lenses in the camera optical lens 30 in Embodiment 3.

TABLE 10

| | Conic coefficient | Aspheric surface coefficients | | | | |
|---|---|---|---|---|---|---|
| | k | A4 | A6 | A8 | A10 | A12 |
| R1 | 7.5917E−01 | −7.5753E−03 | −6.0945E−05 | −1.0969E−03 | 1.1103E−03 | −8.4549E−04 |
| R2 | −7.2548E+00 | 1.0541E−02 | −1.8698E−02 | 1.4074E−02 | 3.2794E−04 | −1.0386E−02 |
| R3 | −1.3916E+01 | −1.0845E−02 | 1.4942E−02 | −1.7887E−02 | 2.3406E−02 | −2.3425E−02 |
| R4 | −3.7923E+01 | 2.9091E−02 | −1.7466E−02 | 1.3769E−02 | −1.4575E−02 | 1.0564E−02 |
| R5 | −4.0747E+01 | 6.6033E−02 | −5.5586E−02 | 2.6761E−02 | 4.1966E−02 | −1.3177E−01 |
| R6 | 7.6585E+01 | 1.1906E−01 | −2.3661E−01 | 5.3021E−01 | −8.7497E−01 | 1.0060E+00 |
| R7 | −1.0609E+00 | −7.2067E−03 | −1.7175E−01 | 4.4007E−01 | −7.6723E−01 | 9.3194E−01 |
| R8 | −6.3681E+01 | 5.5075E−02 | −2.0269E−01 | 3.7535E−01 | −5.3061E−01 | 5.4285E−01 |

| | Conic coefficient | Aspheric surface coefficients | | | |
|---|---|---|---|---|---|
| | k | A14 | A16 | A18 | A20 |
| R1 | 7.5917E−01 | 3.9339E−04 | −1.1216E−04 | 1.7197E−05 | −1.0737E−06 |
| R2 | −7.2548E+00 | 8.4848E−03 | −3.2511E−03 | 6.3424E−04 | −5.0783E−05 |
| R3 | −1.3916E+01 | 1.4152E−02 | −4.9853E−03 | 9.5601E−04 | −7.7318E−05 |
| R4 | −3.7923E+01 | −4.7612E−03 | 1.2302E−03 | −1.4991E−04 | 4.4311E−06 |
| R5 | −4.0747E+01 | 1.7239E−01 | −1.2918E−01 | 5.2895E−02 | −9.0858E−03 |
| R6 | 7.6585E+01 | −7.9610E−01 | 4.0685E−01 | −1.1693E−01 | 1.3595E−02 |
| R7 | −1.0609E+00 | −7.7061E−01 | 4.0578E−01 | −1.2022E−01 | 1.4945E−02 |
| R8 | −6.3681E+01 | −3.8355E−01 | 1.7535E−01 | −4.6181E−02 | 5.2714E−03 |

Table 11 and Table 12 show design data of inflexion points and arrest points of the respective lenses in the camera optical lens 30 according to Embodiment 3 of the present disclosure.

TABLE 11

| | Number(s) of inflexion points | Inflexion point position 1 | Inflexion point position 2 |
|---|---|---|---|
| P1R1 | 1 | 1.515 | / |
| P1R2 | 0 | / | / |
| P2R1 | 0 | / | / |
| P2R2 | 2 | 0.705 | 1.035 |
| P3R1 | 2 | 0.505 | 1.135 |
| P3R2 | 1 | 1.155 | / |
| P4R1 | 1 | 0.665 | / |
| P4R2 | 1 | 0.615 | / |

TABLE 12

| | Number of arrest points | Arrest point position 1 |
|---|---|---|
| P1R1 | 0 | / |
| P1R2 | 0 | / |

TABLE 12-continued

| | Number of arrest points | Arrest point position 1 |
|---|---|---|
| P2R1 | 0 | / |
| P2R2 | 0 | / |
| P3R1 | 0 | / |
| P3R2 | 0 | / |
| P4R1 | 1 | 1.125 |
| P4R2 | 1 | 1.095 |

Figure 10:
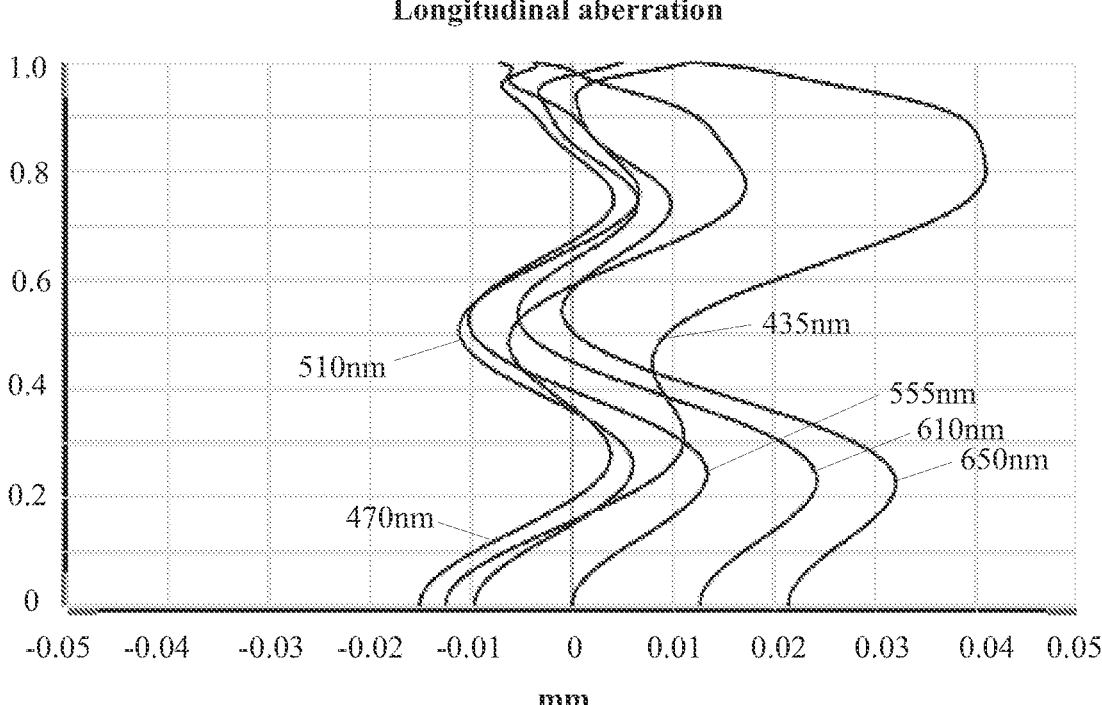
FIG. 10 is a schematic diagram of a longitudinal aberration of the camera optical lens shown in FIG. 9.
Figure 11:
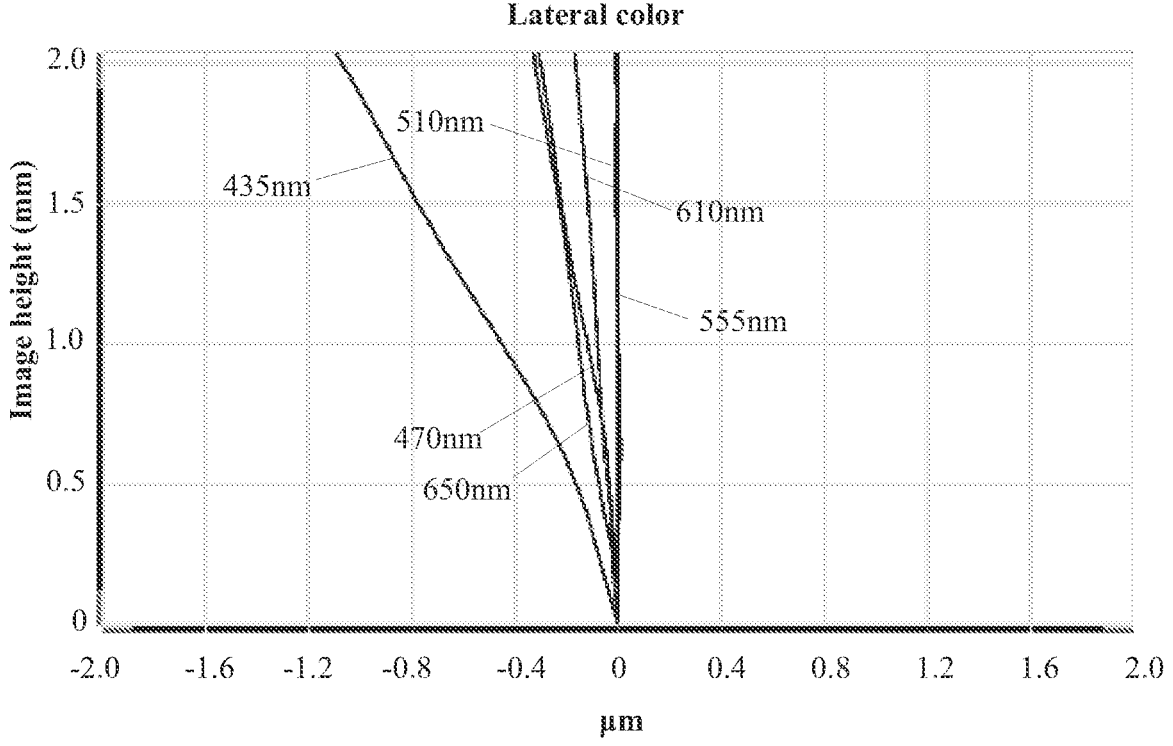
FIG. 11 is a schematic diagram of a lateral color of the camera optical lens shown in FIG. 9.
Figure 12:
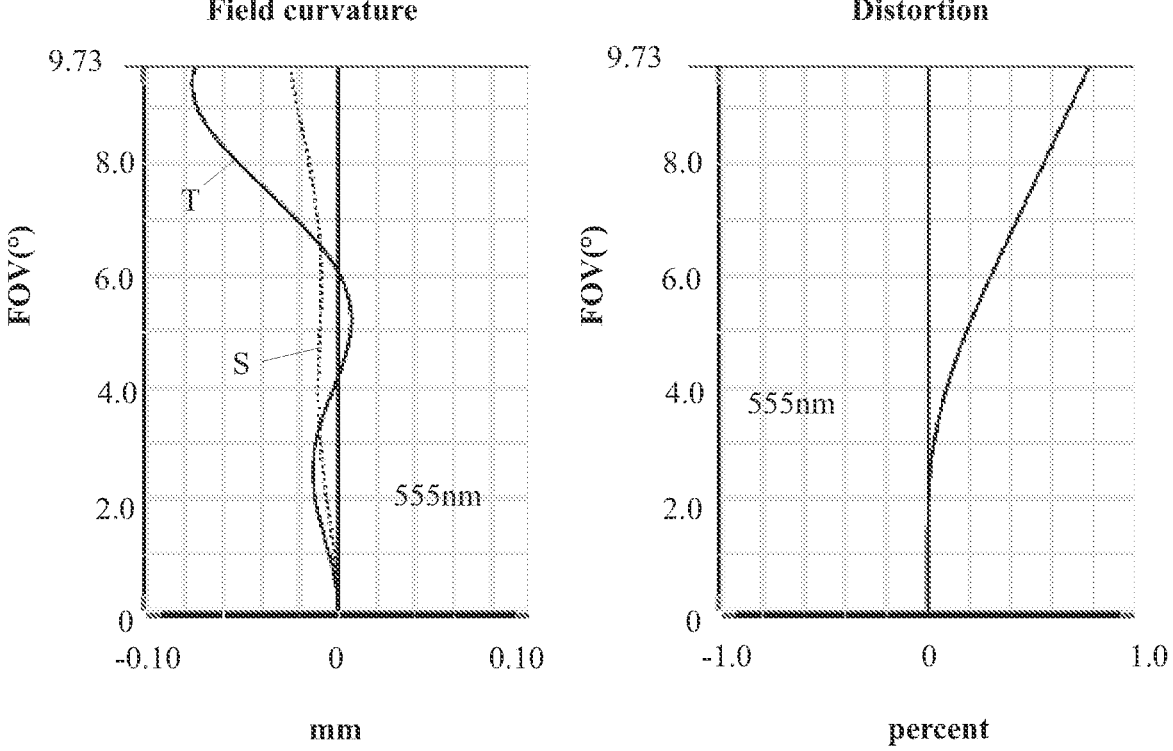
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 435 nm, 470 nm, 510 nm, 555 nm, 610 nm and 650 nm after passing the camera optical lens 30 according to Embodiment 3. FIG. 12 illustrates a field curvature and a distortion of light with a wavelength of 555 nm after passing the camera optical lens 30 according to Embodiment 3. A field curvature S in FIG. 12 is a field curvature in a sagittal direction, and T is a field curvature in a tangential direction.

Values of the conditions in this embodiment are shown in Table 29. It is evident that the camera optical system in this embodiment satisfies the conditions.

In this embodiment, an entrance pupil diameter ENPD of the camera optical lens 30 is 3.40 mm, an image height IH of 1.0H is 2.040 mm, a FOV (field of view) in the diagonal direction is 19.50°. Thus, the camera optical lens 30 satisfies the design requirement of long focal length and ultra-thinness. Its on-axis and off-axis aberrations are fully corrected, thereby achieving excellent optical characteristics.

Embodiment 4

Figure 13:
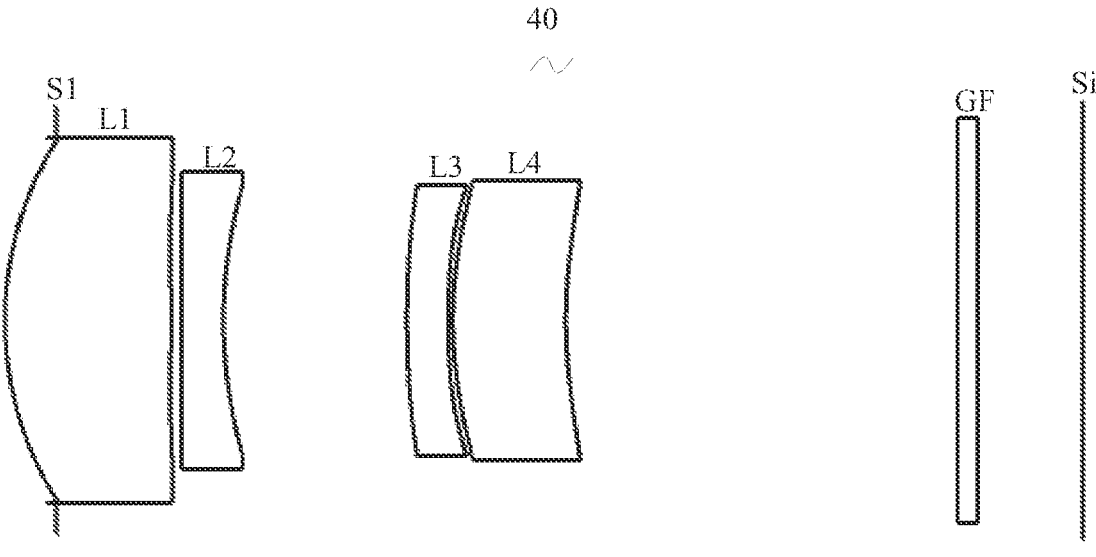
FIG. 13 is a schematic diagram of a structure of a camera optical lens according to Embodiment 4 of the present disclosure.

Embodiment 4 is basically the same as Embodiment 1 and involves symbols having the same meanings as Embodiment 1. A structure of a camera optical lens 40 according to Embodiment 4 of the present disclosure is shown in FIG. 13. Only differences therebetween will be described in the following.

In this embodiment, the image-side surface of the second lens L2 close to the axis is concave, and the object-side surface of the third lens L3 close to the axis is convex.

Table 13 and Table 14 show design data of the camera optical lens 40 in Embodiment 4 of the present disclosure.

TABLE 13

|  | R | d |  | nd |  | vd |
|---|---|---|---|---|---|---|
| S1 | ∞ | d0 = | −0.526 |  |  |  |
| R1 | 2.915 | d1 = | 1.700 | nd1 | 1.5444 | v1 | 55.82 |
| R2 | −29.117 | d2 = | 0.109 |  |  |  |
| R3 | −64.466 | d3 = | 0.430 | nd2 | 1.6400 | v2 | 23.54 |
| R4 | 3.785 | d4 = | 1.882 |  |  |  |
| R5 | 10.702 | d5 = | 0.420 | nd3 | 1.5444 | v3 | 55.82 |
| R6 | 5.739 | d6 = | 0.050 |  |  |  |
| R7 | 3.407 | d7 = | 1.159 | nd4 | 1.6610 | v4 | 20.53 |
| R8 | 4.148 | d8 = | 4.011 |  |  |  |
| R9 | ∞ | d9 = | 0.210 | ndg | 1.5168 | vg | 64.17 |
| R10 | ∞ | d10 = | 1.080 |  |  |  |

Table 14 shows aspheric surface data of lenses in the camera optical lens 40 in Embodiment 4.

TABLE 14

| | Conic coefficient | Aspheric surface coefficients | | | | |
|---|---|---|---|---|---|---|
| | k | A4 | A6 | A8 | A10 | A12 |
| R1 | 8.6629E−01 | −4.0252E−03 | −4.0210E−03 | 6.3019E−03 | −5.5064E−03 | 2.4055E−03 |
| R2 | −2.0000E+02 | 4.2276E−02 | −1.5231E−01 | 3.7212E−01 | −4.9249E−01 | 3.8358E−01 |
| R3 | 2.0004E+02 | 2.9384E−02 | −1.4687E−01 | 3.7569E−01 | −5.1904E−01 | 4.2335E−01 |
| R4 | −1.4578E+01 | 2.6954E−02 | −5.3088E−02 | 1.3540E−01 | −2.2759E−01 | 2.3823E−01 |
| R5 | −1.8675E+02 | 6.6438E−02 | −1.4436E−01 | 3.8228E−01 | −7.8694E−01 | 1.1164E+00 |
| R6 | 1.5740E+01 | 7.9002E−02 | −5.1426E−01 | 1.7254E+00 | −3.5999E+00 | 4.9730E+00 |
| R7 | 6.5999E−01 | 1.3859E−02 | −3.6572E−01 | 1.3305E+00 | −2.8453E+00 | 3.9437E+00 |
| R8 | −5.6971E+01 | 7.6119E−02 | −1.6564E−01 | 3.2367E−01 | −5.1591E−01 | 5.8613E−01 |

| | Conic coefficient | Aspheric surface coefficients | | | |
|---|---|---|---|---|---|
| | k | A14 | A16 | A18 | A20 |
| R1 | 8.6629E−01 | −4.7397E−04 | −1.2078E−05 | 2.0115E−05 | −2.3523E−06 |
| R2 | −2.0000E+02 | −1.8195E−01 | 5.1703E−02 | −8.0655E−03 | 5.2605E−04 |
| R3 | 2.0004E+02 | −2.1039E−01 | 6.2649E−02 | −1.0247E−02 | 7.0140E−04 |
| R4 | −1.4578E+01 | −1.5378E−01 | 5.9591E−02 | −1.2643E−02 | 1.1136E−03 |
| R5 | −1.8675E+02 | −1.0299E+00 | 5.8347E−01 | −1.8369E−01 | 2.4571E−02 |
| R6 | 1.5740E+01 | −4.4668E+00 | 2.4729E+00 | −7.6115E−01 | 9.9194E−02 |
| R7 | 6.5999E−01 | −3.5115E+00 | 1.9169E+00 | −5.8028E−01 | 7.4289E−02 |
| R8 | −5.6971E+01 | −4.4451E−01 | 2.1166E−01 | −5.6872E−02 | 6.5477E−03 |

Table 15 and table 16 show design data of inflexion points and arrest points of each lens of the camera optical lens 40 lens according to Embodiment 4 of the present disclosure.

TABLE 15

|  | Number(s) of inflexion points | Inflexion point position 1 | Inflexion point position 2 |
|---|---|---|---|
| P1R1 | 0 | / | / |
| P1R2 | 2 | 0.475 | 1.405 |
| P2R1 | 2 | 0.595 | 1.375 |
| P2R2 | 0 | / | / |
| P3R1 | 2 | 1.155 | 1.235 |
| P3R2 | 2 | 1.185 | 1.275 |
| P4R1 | 2 | 1.175 | 1.305 |
| P4R2 | 2 | 1.055 | 1.355 |

TABLE 16

|  | Number of arrest points | Arrest point position 1 |
|---|---|---|
| P1R1 | 0 | / |
| P1R2 | 1 | 0.725 |
| P2R1 | 1 | 0.865 |
| P2R2 | 0 | / |
| P3R1 | 0 | / |
| P3R2 | 0 | / |
| P4R1 | 0 | / |
| P4R2 | 0 | / |

Figure 14:
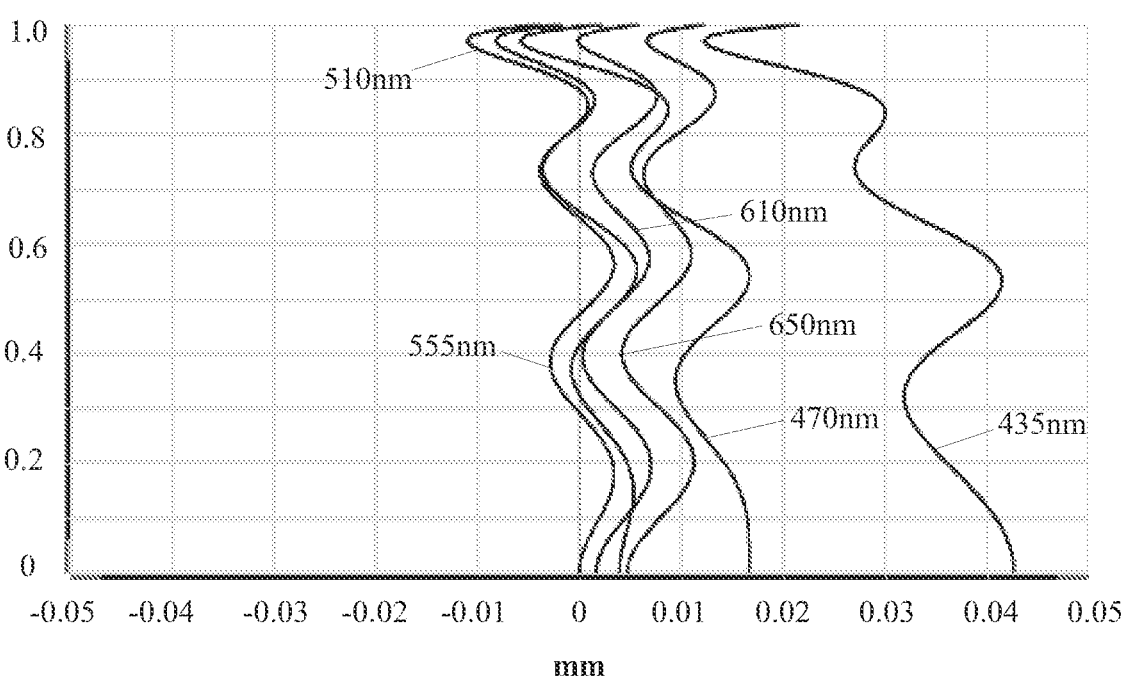
FIG. 14 is a schematic diagram of a longitudinal aberration of the camera optical lens shown in FIG. 13.
Figure 15:
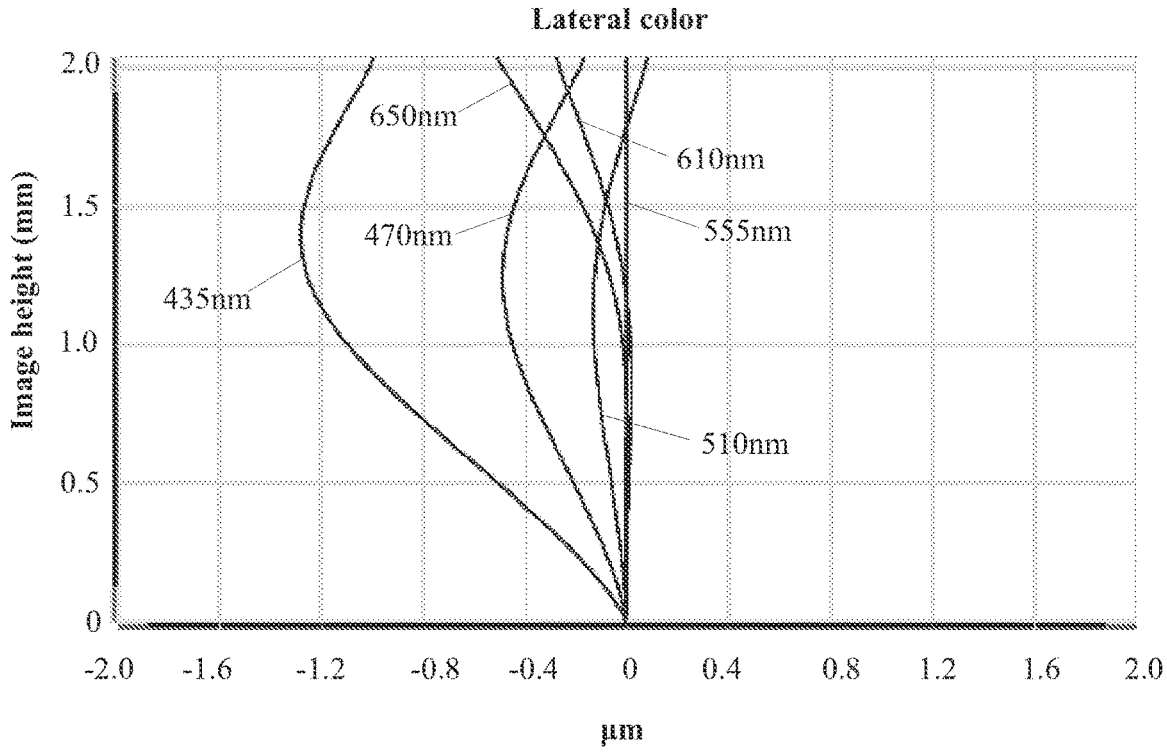
FIG. 15 is a schematic diagram of a lateral color of the camera optical lens shown in FIG. 13.
Figure 16:
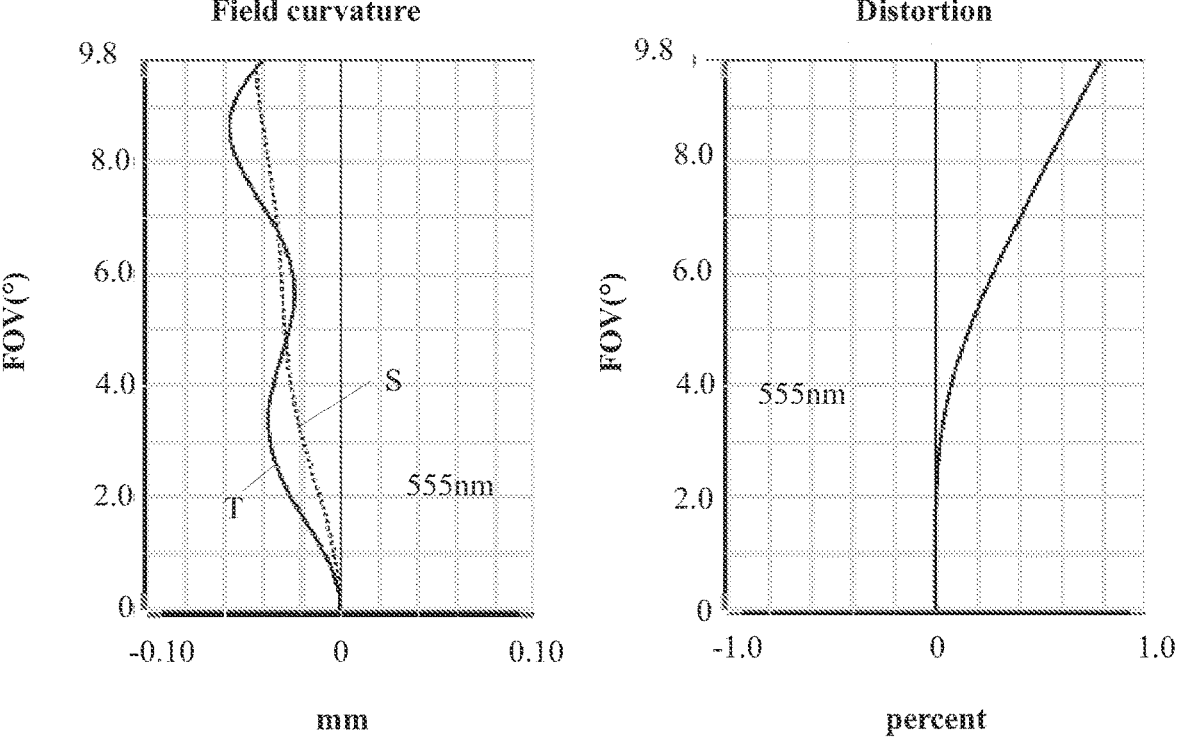
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 435 nm, 470 nm, 510 nm, 555 nm, 610 nm and 650 nm after passing the camera optical lens 40 according to Embodiment 4. FIG. 16 illustrates a field curvature and a distortion of light with a wavelength of 555 nm after passing the camera optical lens 40 according to Embodiment 4. A field curvature S in FIG. 16 is a field curvature in a sagittal direction, and T is a field curvature in a tangential direction.

Values of the conditions in this embodiment are shown in Table 29. It is evident that the camera optical system in this embodiment satisfies the conditions.

In this embodiment, an entrance pupil diameter ENPD of the camera optical lens 40 is 3.400 mm, an image height IH of 1.0H is 2.040 mm, a FOV (field of view) in the diagonal direction is 19.60°. Thus, the camera optical lens 40 satisfies the design requirement of long focal length and ultra-thinness. Its on-axis and off-axis aberrations are fully corrected, thereby achieving excellent optical characteristics.

Embodiment 5

Figure 17:
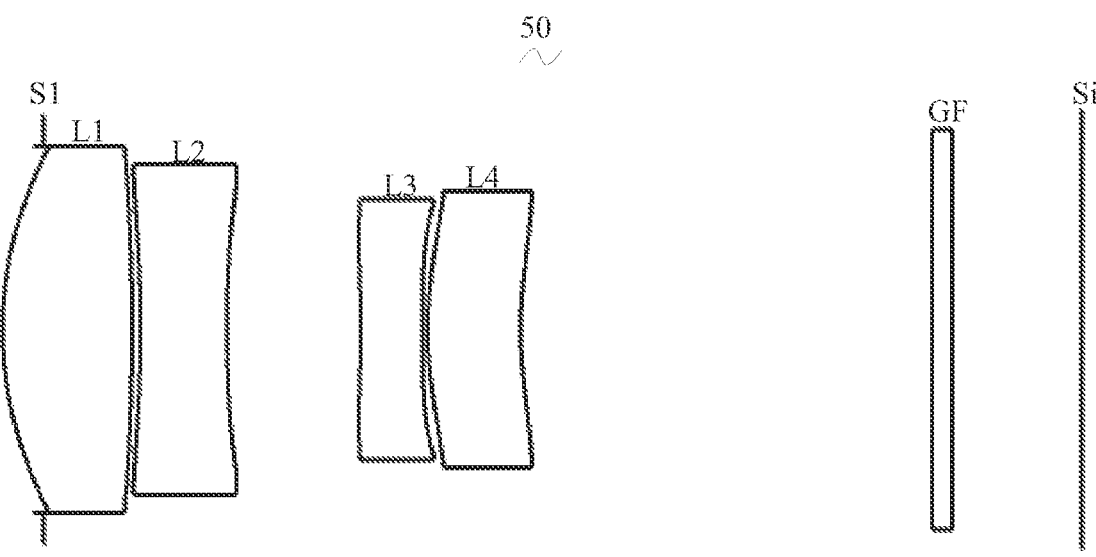
FIG. 17 is a schematic diagram of a structure of a camera optical lens according to Embodiment 5 of the present disclosure.

Embodiment 5 is basically the same as Embodiment 1 and involves symbols having the same meanings as Embodiment 1. A structure of a camera optical lens 50 according to Embodiment 5 of the present disclosure is shown in FIG. 17. Only differences therebetween will be described in the following.

In this embodiment, the image-side surface of the second lens L2 close to the axis is concave, and the image-side surface of the third lens L3 close to the axis is convex.

Table 17 and Table 18 show design data of the camera optical lens 50 in Embodiment 5 of the present disclosure.

TABLE 17

|  | R |  | d |  | nd |  | vd |
|---|---|---|---|---|---|---|---|
| S1 | ∞ | d0 = | −0.420 |  |  |  |  |
| R1 | 3.072 | d1 = | 1.328 | nd1 | 1.5444 | v1 | 55.82 |
| R2 | −16.781 | d2 = | 0.087 |  |  |  |  |
| R3 | −8.765 | d3 = | 0.883 | nd2 | 1.6400 | v2 | 23.54 |
| R4 | 12.465 | d4 = | 1.373 |  |  |  |  |
| R5 | −5.848 | d5 = | 0.634 | nd3 | 1.5444 | v3 | 55.82 |
| R6 | −20.292 | d6 = | 0.050 |  |  |  |  |
| R7 | 3.553 | d7 = | 0.951 | nd4 | 1.6610 | v4 | 20.53 |
| R8 | 3.643 | d8 = | 4.212 |  |  |  |  |
| R9 | ∞ | d9 = | 0.210 | ndg | 1.5168 | vg | 64.17 |
| R10 | ∞ | d10 = | 1.323 |  |  |  |  |

Table 18 shows aspheric surface data of lenses in the camera optical lens 50 in Embodiment 5.

TABLE 18

| | Conic coefficient | Aspheric surface coefficients | | | | |
|---|---|---|---|---|---|---|
| | k | A4 | A6 | A8 | A10 | A12 |
| R1 | 7.8469E−01 | −5.3282E−03 | −4.0216E−03 | 5.9986E−03 | −5.4549E−03 | 2.4171E−03 |
| R2 | 1.0152E+01 | 2.7210E−02 | −1.5072E−01 | 3.7232E−01 | −4.9304E−01 | 3.8450E−01 |
| R3 | −2.7377E+01 | 3.2397E−02 | −1.4809E−01 | 3.7631E−01 | −5.1878E−01 | 4.2304E−01 |
| R4 | −1.5877E+02 | 3.0091E−02 | −5.0401E−02 | 1.3350E−01 | −2.2861E−01 | 2.3870E−01 |
| R5 | −5.0772E+01 | 8.5334E−02 | −1.3662E−01 | 3.7340E−01 | −7.9035E−01 | 1.1177E+00 |
| R6 | −2.0002E+02 | 1.8640E−01 | −5.3351E−01 | 1.7072E+00 | −3.5984E+00 | 4.9769E+00 |
| R7 | 2.6684E+00 | 2.4634E−02 | −3.8371E−01 | 1.3260E+00 | −2.8471E+00 | 3.9458E+00 |
| R8 | −4.1235E+01 | 5.2305E−02 | −1.5965E−01 | 3.2435E−01 | −5.1861E−01 | 5.8591E−01 |

| | Conic coefficient | Aspheric surface coefficients | | | |
|---|---|---|---|---|---|
| | k | A14 | A16 | A18 | A20 |
| R1 | 7.8469E−01 | −4.7396E−04 | −1.4108E−05 | 2.0492E−05 | −2.3536E−06 |
| R2 | 1.0152E+01 | −1.8235E−01 | 5.1706E−02 | −8.0551E−03 | 5.2924E−04 |
| R3 | −2.7377E+01 | −2.1021E−01 | 6.2560E−02 | −1.0246E−02 | 7.0936E−04 |
| R4 | −1.5877E+02 | −1.5359E−01 | 5.9398E−02 | −1.2651E−02 | 1.1393E−03 |
| R5 | −5.0772E+01 | −1.0282E+00 | 5.8367E−01 | −1.8434E−01 | 2.4660E−02 |
| R6 | −2.0002E+02 | −4.4654E+00 | 2.4729E+00 | −7.6123E−01 | 9.9046E−02 |
| R7 | 2.6684E+00 | −3.5101E+00 | 1.9169E+00 | −5.8086E−01 | 7.4440E−02 |
| R8 | −4.1235E+01 | −4.4317E−01 | 2.1178E−01 | −5.7435E−02 | 6.7071E−03 |

Table 19 and Table 20 show design data inflexion points and arrest points of the respective lenses in the camera optical lens 50 according to Embodiment 5 of the present disclosure.

TABLE 19

|  | Number(s) of inflexion points | Inflexion point position 1 | Inflexion point position 2 |
|---|---|---|---|
| P1R1 | 0 | / | / |
| P1R2 | 0 | / | / |
| P2R1 | 2 | 1.055 | 1.455 |
| P2R2 | 0 | / | / |
| P3R1 | 2 | 0.425 | 1.115 |
| P3R2 | 2 | 0.165 | 1.205 |
| P4R1 | 1 | 0.905 | / |
| P4R2 | 1 | 0.765 | / |

TABLE 20

|  | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 1 | 0.825 |
| P3R2 | 1 | 0.295 |
| P4R1 | 0 | / |
| P4R2 | 0 | / |

Figure 18:
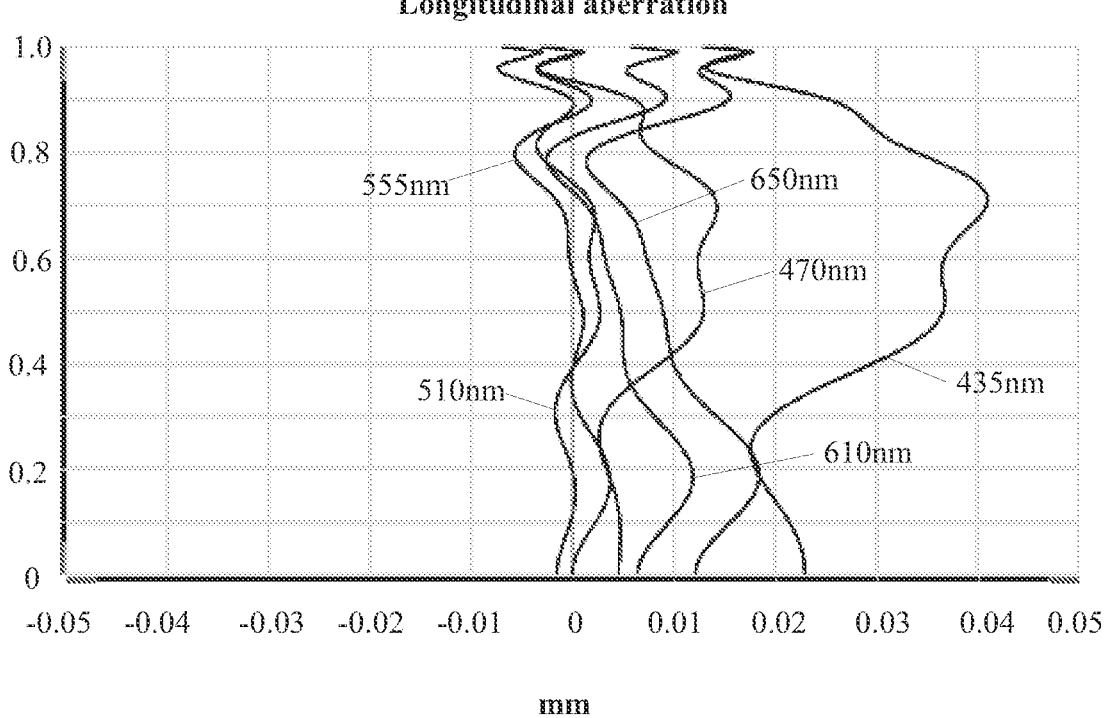
FIG. 18 is a schematic diagram of a longitudinal aberration of the camera optical lens shown in FIG. 17.
Figure 19:
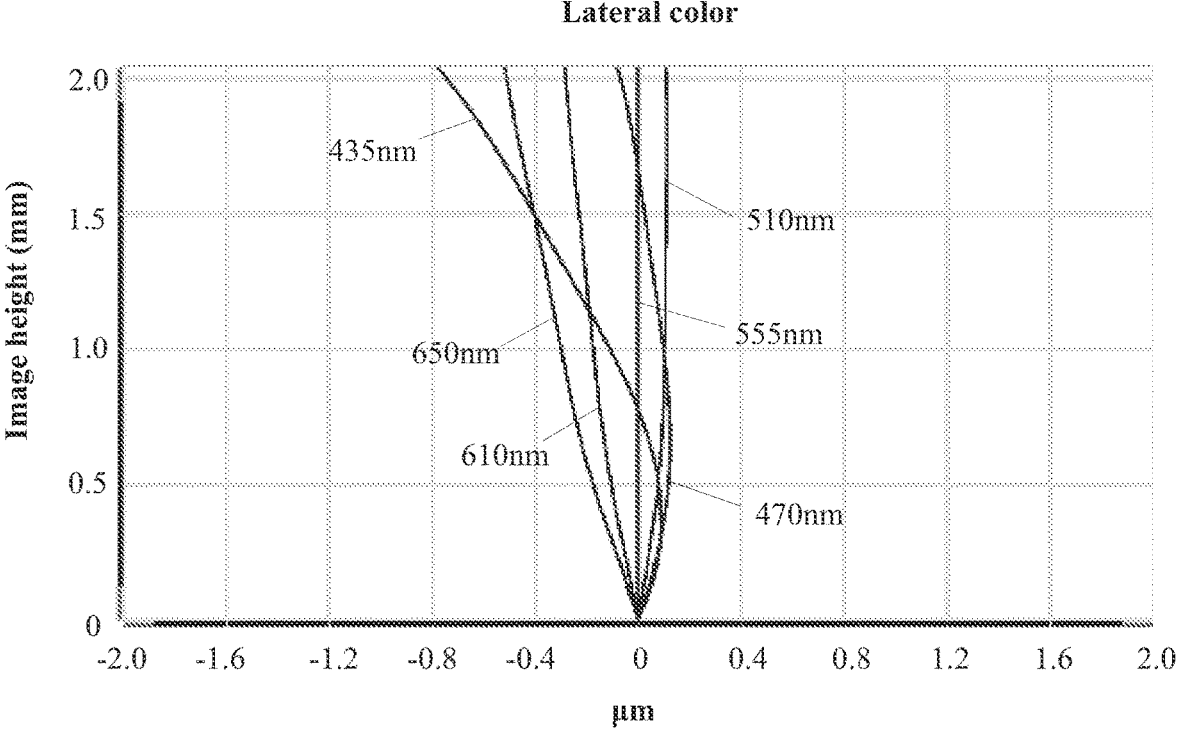
FIG. 19 is a schematic diagram of a lateral color of the camera optical lens shown in FIG. 17.
Figure 20:
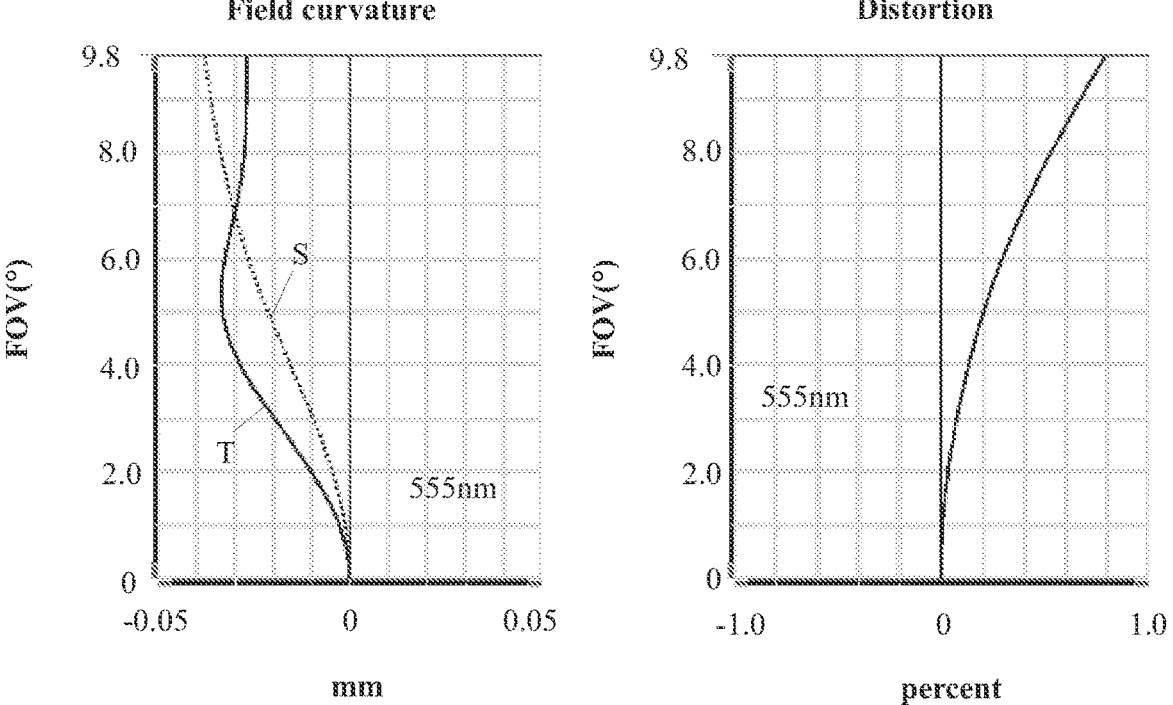
FIG. 20 is a schematic diagram of a field curvature and a distortion of the camera optical lens shown in FIG. 17.

FIG. 18 and FIG. 19 illustrate a longitudinal aberration and a lateral color of light with wavelengths of 435 nm, 470 nm, 510 nm, 555 nm, 610 nm and 650 nm after passing the camera optical lens 50 according to Embodiment 5. FIG. 20 illustrates a field curvature and a distortion of light with a wavelength of 555 nm after passing the camera optical lens 50 according to Embodiment 5. A field curvature S in FIG. 20 is a field curvature in a sagittal direction, and T is a field curvature in a tangential direction.

Values of the conditions in this embodiment are shown in Table 29. It is evident that the camera optical system in this embodiment satisfies the conditions.

In this embodiment, an entrance pupil diameter ENPD of the camera optical lens 50 is 3.400 mm, an image height IH of 1.0H is 2.040 mm, a FOV (field of view) in the diagonal direction is 19.60°. Thus, the camera optical lens 50 satisfies the design requirement of long focal length and ultra-thinness. Its on-axis and off-axis aberrations are fully corrected, thereby achieving excellent optical characteristics.

Embodiment 6

Figure 21:
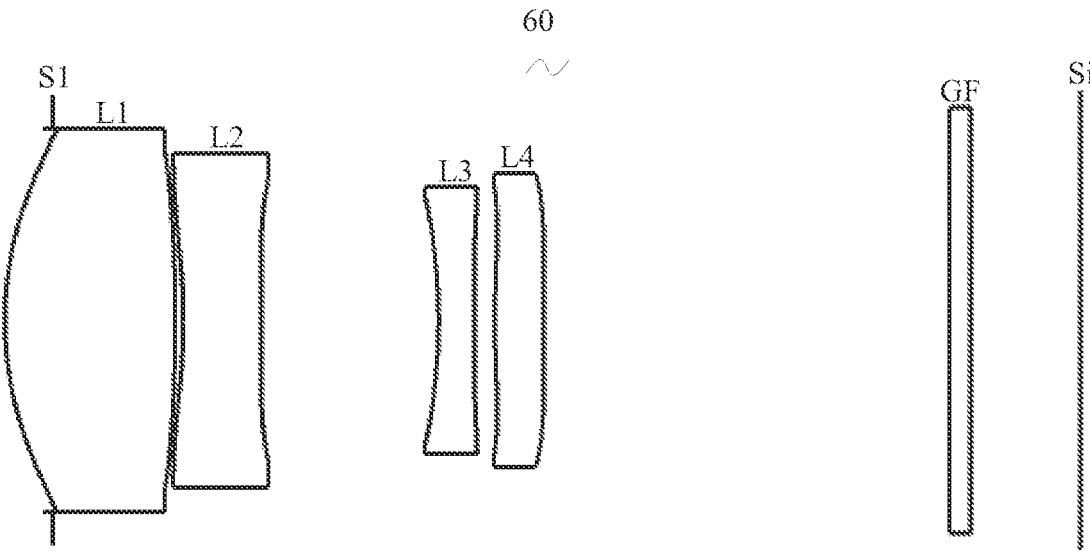
FIG. 21 is a schematic diagram of a structure of a camera optical lens according to Embodiment 6 of the present disclosure.

Embodiment 6 is basically the same as Embodiment 1 and involves symbols having the same meanings as Embodiment 1. A structure of a camera optical lens 60 according to Embodiment 6 of the present disclosure is shown in FIG. 21. Only differences therebetween will be described in the following.

In this embodiment, the image-side surface of the third lens L3 close to the axis is convex.

Table 21 and Table 22 show design data of the camera optical lens 60 in Embodiment 6 of the present disclosure.

TABLE 21

|    | R | d | | nd | | vd | |
|----|----|-----|-----|-----|-----|-----|-----|
| S1 | ∞ | d0 = | −0.474 | | | | |
| R1 | 2.790 | d1 = | 1.669 | nd1 | 1.5444 | v1 | 55.82 |
| R2 | −13.396 | d2 = | 0.082 | | | | |
| R3 | −4.486 | d3 = | 0.760 | nd2 | 1.6400 | v2 | 23.54 |
| R4 | −47.767 | d4 = | 1.742 | | | | |
| R5 | −4.147 | d5 = | 0.349 | nd3 | 1.5444 | v3 | 55.82 |
| R6 | −16268.543 | d6 = | 0.205 | | | | |
| R7 | 9.157 | d7 = | 0.477 | nd4 | 1.6610 | v4 | 20.53 |
| R8 | 27.203 | d8 = | 3.973 | | | | |
| R9 | ∞ | d9 = | 0.210 | ndg | 1.5168 | vg | 64.17 |
| R10 | ∞ | d10 = | 1.079 | | | | |

Table 22 shows aspheric surface data of lenses in the camera optical lens 60 in Embodiment 6.

TABLE 22

| | Conic coefficient | Aspheric surface coefficients | | | | |
|----|----|----|----|----|----|----|
| | k | A4 | A6 | A8 | A10 | A12 |
| R1 | 7.2427E−01 | −5.9601E−03 | −5.8691E−03 | 6.4297E−03 | −5.5338E−03 | 2.3797E−03 |
| R2 | 1.9462E+00 | 2.5625E−02 | −1.5069E−01 | 3.7261E−01 | −4.9325E−01 | 3.8432E−01 |
| R3 | −1.5623E+01 | 4.0727E−02 | −1.4405E−01 | 3.7561E−01 | −5.1923E−01 | 4.2305E−01 |
| R4 | 2.0000E+02 | 4.1721E−02 | −3.9249E−02 | 1.2708E−01 | −2.2735E−01 | 2.4003E−01 |
| R5 | 2.6617E+00 | 6.2827E−02 | −1.5784E−01 | 4.0811E−01 | −8.0755E−01 | 1.1133E+00 |
| R6 | 1.9996E+02 | 1.1557E−01 | −5.2670E−01 | 1.7064E+00 | −3.5924E+00 | 4.9744E+00 |
| R7 | 3.8578E+00 | 2.1692E−02 | −3.9757E−01 | 1.3444E+00 | −2.8509E+00 | 3.9406E+00 |
| R8 | −2.0001E+02 | −1.4472E−02 | −1.1459E−01 | 3.1077E−01 | −5.2432E−01 | 5.8879E−01 |

| | Conic coefficient | Aspheric surface coefficients | | | |
|----|----|----|----|----|----|
| | k | A14 | A16 | A18 | A20 |
| R1 | 7.2427E−01 | −4.7707E−04 | −1.2259E−05 | 2.1057E−05 | −2.5304E−06 |
| R2 | 1.9462E+00 | −1.8237E−01 | 5.1730E−02 | −8.0410E−03 | 5.2505E−04 |
| R3 | −1.5623E+01 | −2.1017E−01 | 6.2564E−02 | −1.0252E−02 | 7.1086E−04 |
| R4 | 2.0000E+02 | −1.5369E−01 | 5.9081E−02 | −1.2692E−02 | 1.1962E−03 |
| R5 | 2.6617E+00 | −1.0232E+00 | 5.8517E−01 | −1.8558E−01 | 2.4652E−02 |
| R6 | 1.9996E+02 | −4.4671E+00 | 2.4736E+00 | −7.6054E−01 | 9.8793E−02 |
| R7 | 3.8578E+00 | −3.5102E+00 | 1.9181E+00 | −5.8039E−01 | 7.4181E−02 |
| R8 | −2.0001E+02 | −4.4277E−01 | 2.1157E−01 | −5.7354E−02 | 6.6649E−03 |

Table 23 and Table 24 show design data inflexion points and arrest points of the respective lenses in the camera optical lens 60 according to Embodiment 6 of the present disclosure.

TABLE 23

| | Number(s) of inflexion points | Inflexion point position 1 | Inflexion point position 2 | Inflexion point position 3 | Inflexion point position 4 |
|------|----|----|----|----|----|
| P1R1 | 1 | 1.555 | / | / | / |
| P1R2 | 0 | / | / | / | / |
| P2R1 | 1 | 0.735 | / | / | / |
| P2R2 | 1 | 0.215 | / | / | / |
| P3R1 | 0 | / | / | / | / |
| P3R2 | 4 | 0.015 | 0.915 | 1.075 | 1.205 |
| P4R1 | 1 | 0.475 | / | / | / |
| P4R2 | 1 | 0.315 | / | / | / |

TABLE 24

| | Number of arrest points | Arrest point position 1 |
|------|----|----|
| P1R1 | 0 | / |
| P1R2 | 0 | / |
| P2R1 | 1 | 1.425 |
| P2R2 | 1 | 0.375 |
| P3R1 | 0 | / |
| P3R2 | 1 | 0.015 |
| P4R1 | 1 | 0.835 |
| P4R2 | 1 | 0.515 |

Figure 22:
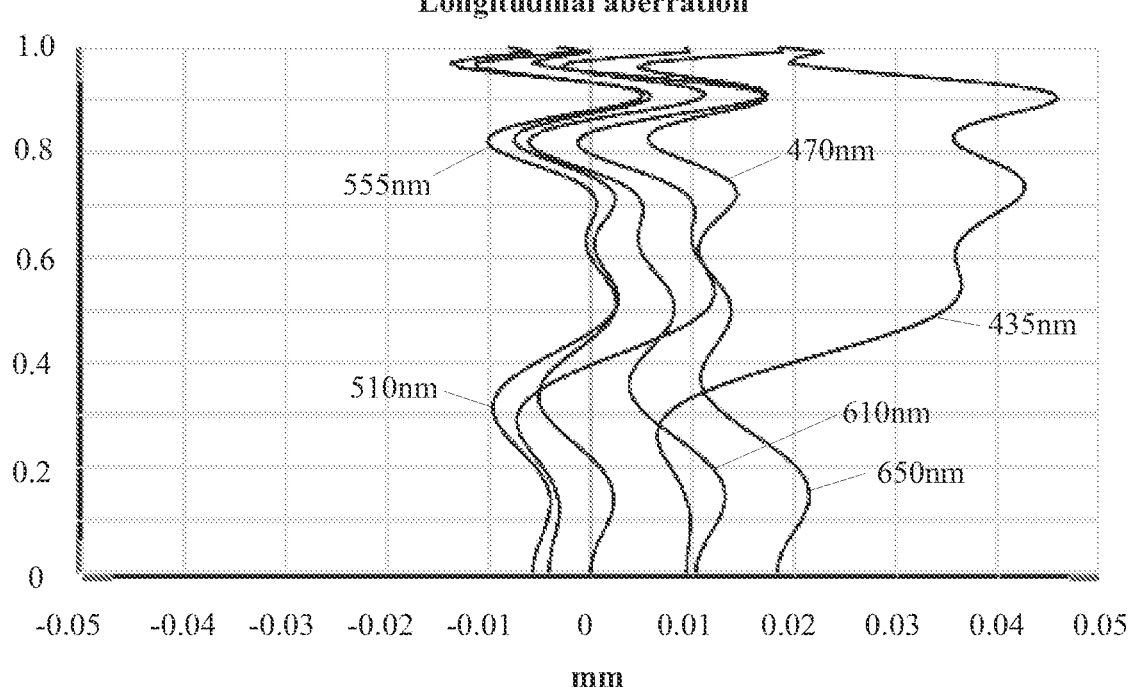
FIG. 22 is a schematic diagram of a longitudinal aberration of the camera optical lens shown in FIG. 21.
Figure 23:
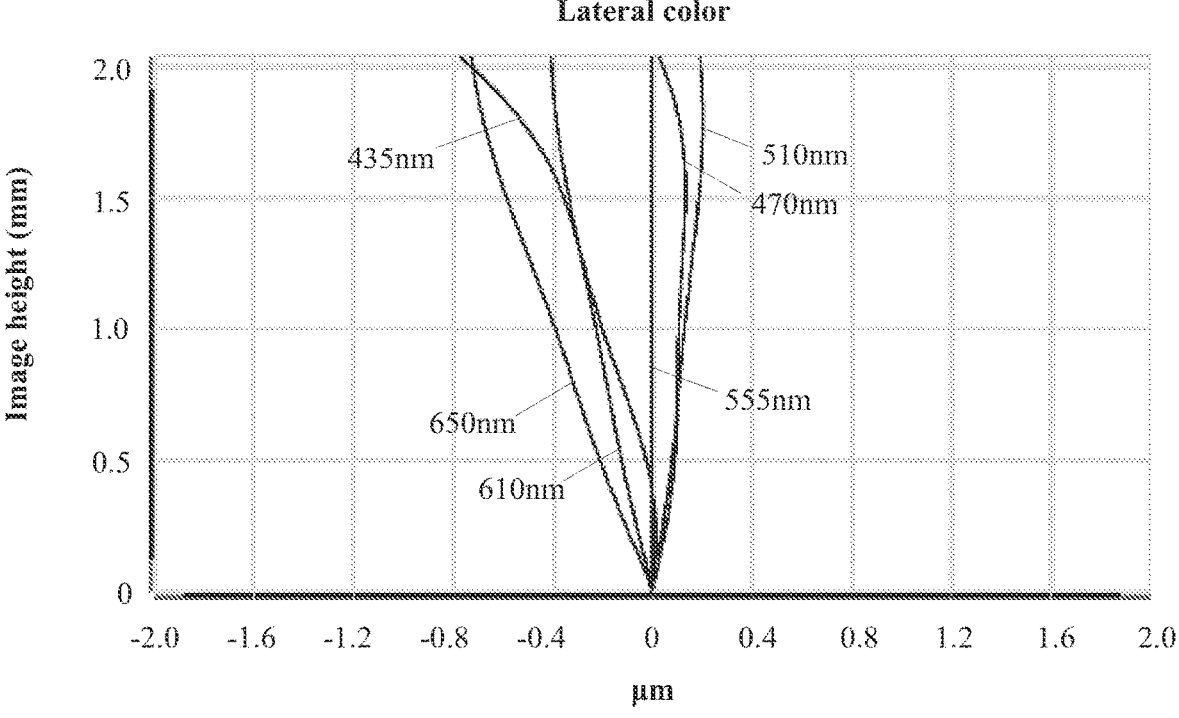
FIG. 23 is a schematic diagram of a lateral color of the camera optical lens shown in FIG. 21.
Figure 24:
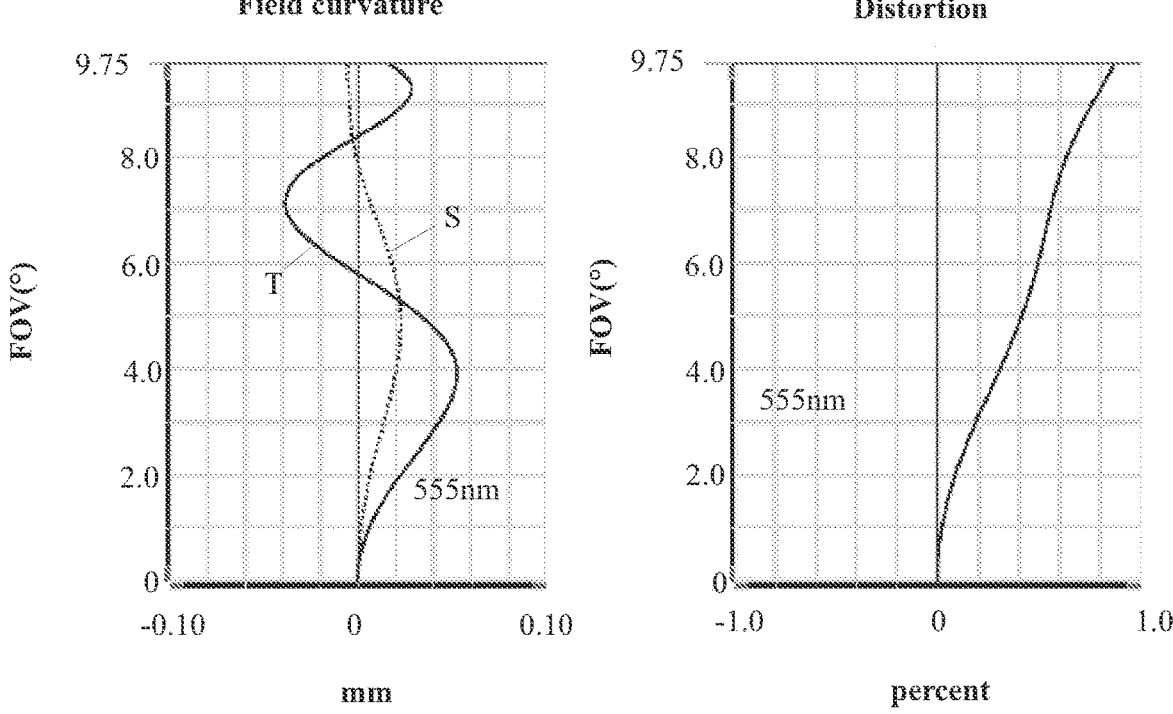
FIG. 24 is a schematic diagram of a field curvature and a distortion of the camera optical lens shown in FIG. 21.

FIG. 22 and FIG. 23 illustrate a longitudinal aberration and a lateral color of light with wavelengths of 435 nm, 470 nm, 510 nm, 555 nm, 610 nm and 650 nm after passing the camera optical lens 60 according to Embodiment 6. FIG. 24 illustrates a field curvature and a distortion of light with a wavelength of 555 nm after passing the camera optical lens 60 according to Embodiment 6. A field curvature S in FIG. 24 is a field curvature in a sagittal direction, and T is a field curvature in a tangential direction.

Values of the conditions in this embodiment are shown in Table 29. It is evident that the camera optical system in this embodiment satisfies the conditions.

In this embodiment, an entrance pupil diameter ENPD of the camera optical lens 60 is 3.400 mm, an image height IH of 1.0H is 2.040 mm, a FOV (field of view) in the diagonal direction is 19.50°. Thus, the camera optical lens 60 satisfies the design requirement of long focal length and ultra-thinness. Its on-axis and off-axis aberrations are fully corrected, thereby achieving excellent optical characteristics.

Comparison Embodiment

Figure 25:
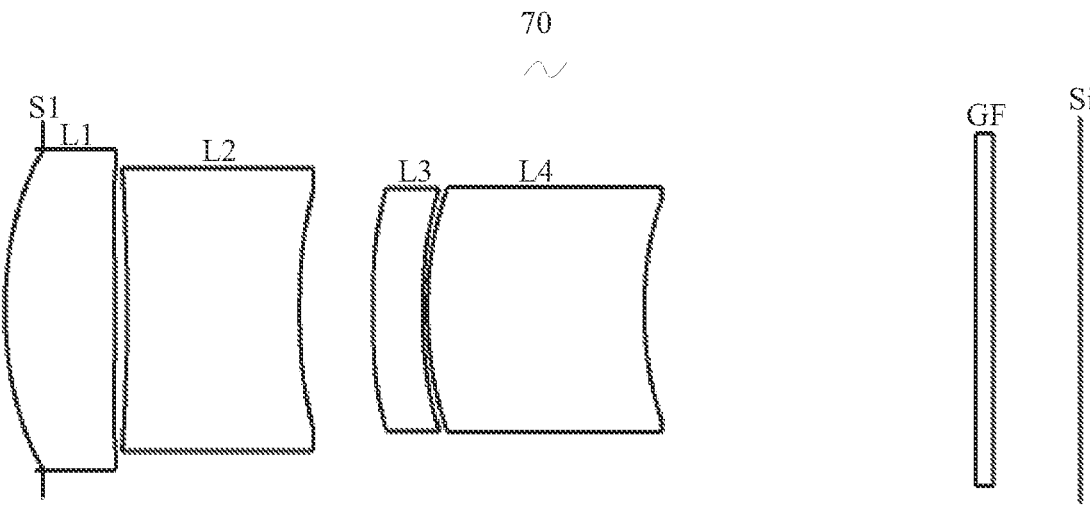
FIG. 25 is a schematic diagram of a structure of a camera optical lens according to a comparison embodiment of the present disclosure.

The comparison embodiment involves symbols having the same meanings as Embodiment 1. A structure of a camera optical lens 70 according to the comparison embodiment of the present disclosure is shown in FIG. 25. Only differences therebetween will be described in the following.

In this embodiment, the image-side surface of the second lens L2 close to the axis is concave, and the object-side surface of the third lens L3 close to the axis is convex.

Table 25 and Table 26 show design data of the camera optical lens 70 in the comparison embodiment of the present disclosure.

TABLE 25

|    | R        | d     |       | nd    |    | vd    |
|----|----------|-------|-------|-------|----|-------|
| S1 | ∞        | d0 =  | −0.447|       |    |       |
| R1 | 3.790    | d1 =  | 1.295 | nd1   | 1.5444 | v1 | 55.82 |
| R2 | −12.868  | d2 =  | 0.143 |       |    |       |
| R3 | −9.883   | d3 =  | 2.017 | nd2   | 1.6400 | v2 | 23.54 |
| R4 | 6.636    | d4 =  | 0.865 |       |    |       |
| R5 | 14.579   | d5 =  | 0.586 | nd3   | 1.5444 | v3 | 55.82 |
| R6 | 7.168    | d6 =  | 0.050 |       |    |       |
| R7 | 3.735    | d7 =  | 2.549 | nd4   | 1.6610 | v4 | 20.53 |
| R8 | 3.770    | d8 =  | 3.891 |       |    |       |
| R9 | ∞        | d9 =  | 0.210 | ndg   | 1.5168 | vg | 64.17 |
| R10| ∞        | d10 = | 1.023 |       |    |       |

Table 26 shows aspheric surface data of lenses in the camera optical lens 70 in the comparison embodiment.

TABLE 26

| | Conic coefficient | Aspheric surface coefficients | | | | |
|----|------------|------------|------------|------------|------------|------------|
| | K | A4 | A6 | A8 | A10 | A12 |
| R1 | 1.3239E+00 | 9.0691E−04 | −4.2810E−03 | 6.7216E−03 | −5.4322E−03 | 2.4090E−03 |
| R2 | −2.0002E+02 | 3.9729E−02 | −1.5105E−01 | 3.7159E−01 | −4.9290E−01 | 3.8453E−01 |
| R3 | −1.7394E+02 | 3.2045E−02 | −1.4832E−01 | 3.7592E−01 | −5.1928E−01 | 4.2296E−01 |
| R4 | −3.5911E+01 | 5.5063E−02 | −5.8825E−02 | 1.3245E−01 | −2.2811E−01 | 2.3842E−01 |
| R5 | 6.1293E+01 | 8.5153E−02 | −1.4376E−01 | 3.7892E−01 | −7.8814E−01 | 1.1160E+00 |
| R6 | 2.7640E+01 | 1.2598E−01 | −5.5027E−01 | 1.7170E+00 | −3.5929E+00 | 4.9768E+00 |
| R7 | 3.5961E+00 | 5.7893E−02 | −4.0018E−01 | 1.3319E+00 | −2.8423E+00 | 3.9455E+00 |
| R8 | −4.0688E+01 | 1.0703E−01 | −1.5525E−01 | 3.1179E−01 | −5.1565E−01 | 5.9080E−01 |

| | Conic coefficient | Aspheric surface coefficients | | | |
|----|------------|------------|------------|------------|------------|
| | k | A14 | A16 | A18 | A20 |
| R1 | 1.3239E+00 | −4.7574E−04 | −1.3863E−05 | 2.0841E−05 | −2.3363E−06 |
| R2 | −2.0002E+02 | −1.8236E−01 | 5.1696E−02 | −8.0558E−03 | 5.3450E−04 |
| R3 | −1.7394E+02 | −2.1019E−01 | 6.2583E−02 | −1.0240E−02 | 7.0821E−04 |
| R4 | −3.5911E+01 | −1.5376E−01 | 5.9614E−02 | −1.2478E−02 | 1.0345E−03 |
| R5 | 6.1293E+01 | −1.0296E+00 | 5.8419E−01 | −1.8346E−01 | 2.4284E−02 |
| R6 | 2.7640E+01 | −4.4669E+00 | 2.4724E+00 | −7.6107E−01 | 9.9025E−02 |
| R7 | 3.5961E+00 | −3.5109E+00 | 1.9166E+00 | −5.8102E−01 | 7.4560E−02 |
| R8 | −4.0688E+01 | −4.4391E−01 | 2.1047E−01 | −5.7944E−02 | 7.1538E−03 |

Table 27 and Table 28 show design data inflexion points and arrest points of the respective lenses in the camera optical lens 70 according to the comparison embodiment of the present disclosure.

TABLE 27

| | Number(s) of inflexion points | Inflexion point position 1 | Inflexion point position 2 | Inflexion point position 3 |
|------|---|-------|-------|-------|
| P1R1 | 0 | /     | /     | /     |
| P1R2 | 1 | 0.585 | /     | /     |
| P2R1 | 3 | 0.695 | 0.885 | 1.385 |
| P2R2 | 0 |       |       |       |
| P3R1 | 0 | /     | /     | /     |
| P3R2 | 2 | 1.205 | 1.275 | /     |
| P4R1 | 2 | 1.225 | 1.285 | /     |
| P4R2 | 0 | /     | /     | /     |

TABLE 28

| | Number of arrest points | Arrest point position 1 |
|------|---|-------|
| P1R1 | 0 | /     |
| P1R2 | 1 | 1.025 |
| P2R1 | 0 | /     |
| P2R2 | 0 | /     |
| P3R1 | 0 | /     |
| P3R2 | 0 | /     |
| P4R1 | 0 | /     |
| P4R2 | 0 | /     |

Figure 26:
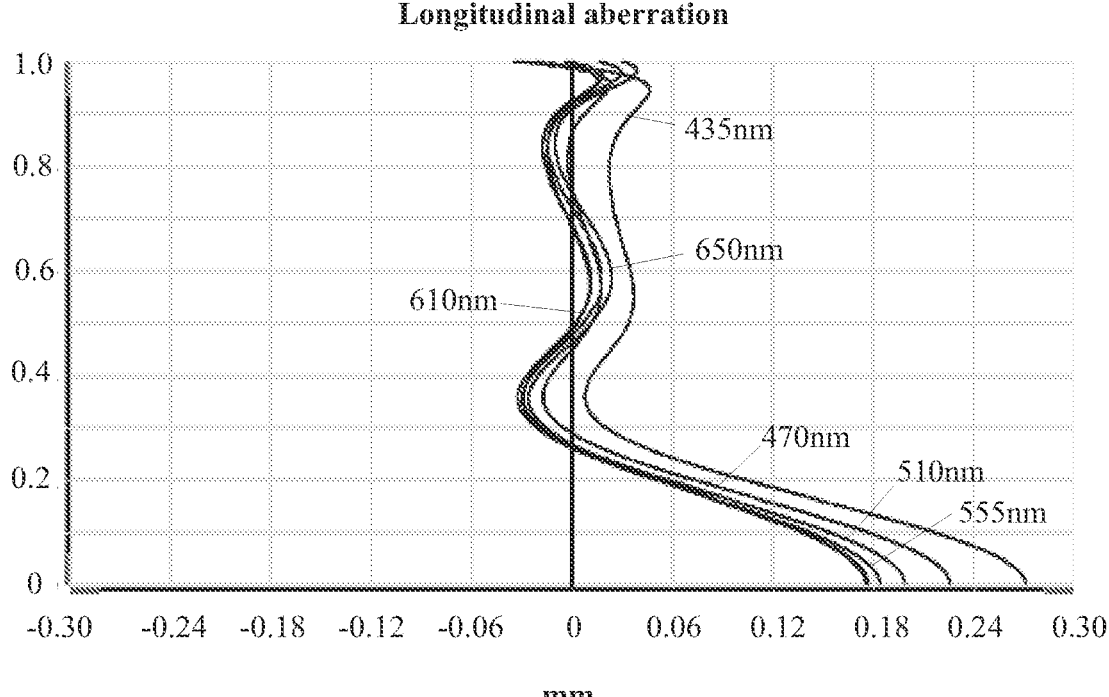
FIG. 26 is a schematic diagram of a longitudinal aberration of the camera optical lens shown in FIG. 25.
Figure 27:
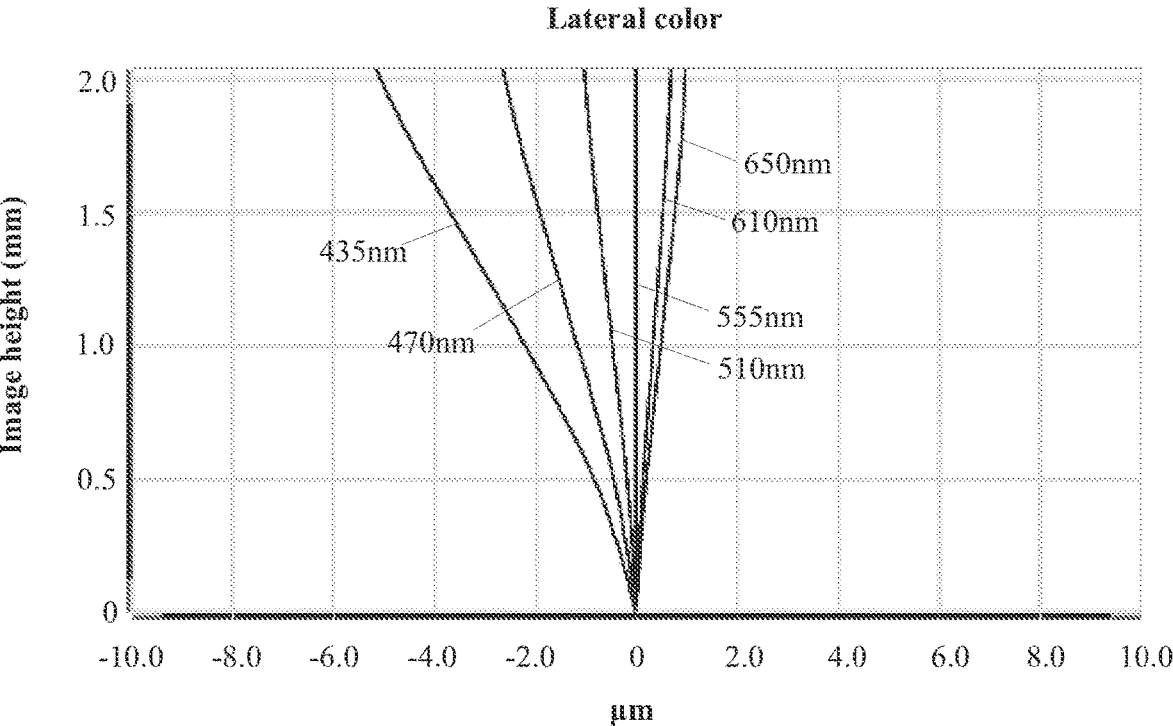
FIG. 27 is a schematic diagram of a lateral color of the camera optical lens shown in FIG. 25.
Figure 28:
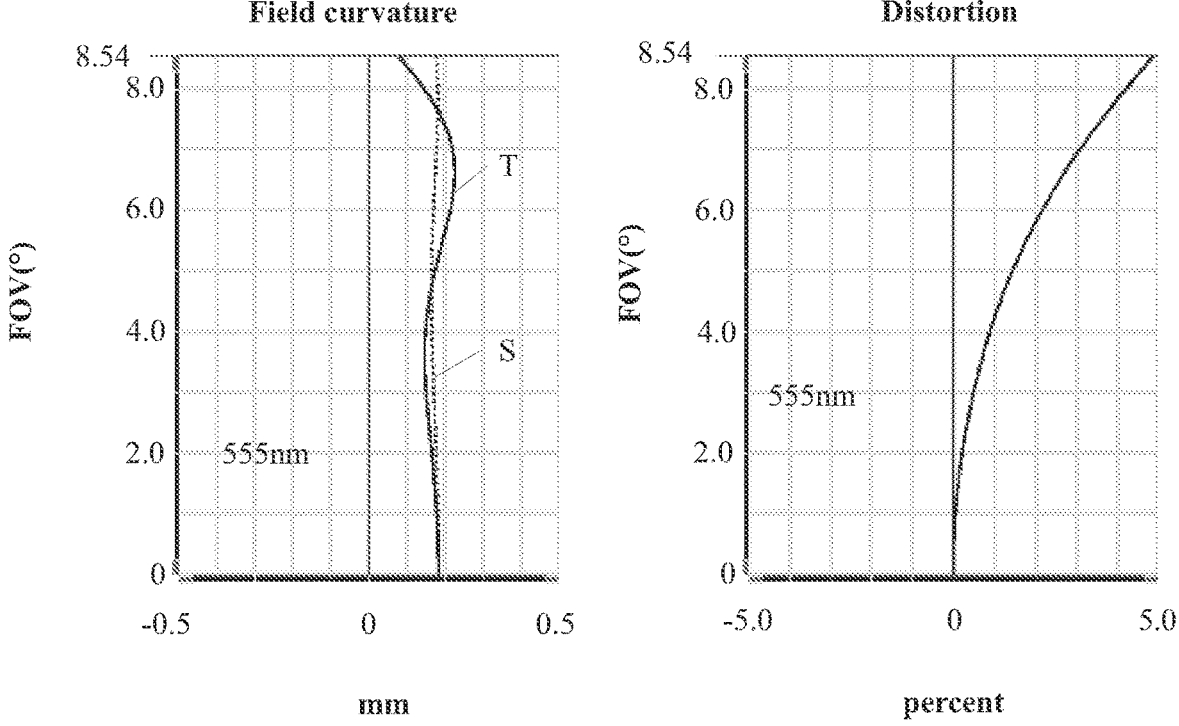
FIG. 28 is a schematic diagram of a field curvature and a distortion of the camera optical lens shown in FIG. 25.

FIG. 26 and FIG. 27 illustrate a longitudinal aberration and a lateral color of light with wavelengths of 435 nm, 470 nm, 510 nm, 555 nm, 610 nm and 650 nm after passing the camera optical lens 70 according to the comparison embodiment. FIG. 28 illustrates a field curvature and a distortion of light with a wavelength of 555 nm after passing the camera optical lens 70 according to the comparison embodiment. A field curvature S in FIG. 28 is a field curvature in a sagittal direction, and T is a field curvature in a tangential direction.

Values of the conditions in this embodiment are shown in Table 29. It is evident that the camera optical lens 70 in this embodiment does not satisfy the condition of 0.50≤f12/f≤1.20.

In this embodiment, an entrance pupil diameter ENPD of the camera optical lens 70 is 3.400 mm, an image height IH of 1.0H is 2.040 mm, a FOV (field of view) in the diagonal direction is 17.07°. Thus, the camera optical lens 70 does not satisfy the design requirement of long focal length and ultra-thinness.

TABLE 29

| Parameters and conditions | Embodiment 1 | Embodiment 2 | Embodiment 3 | Embodiment 4 | Embodiment 5 | Embodiment 6 | Comparison embodiment |
|---|---|---|---|---|---|---|---|
| f | 11.781 | 11.770 | 11.795 | 11.701 | 11.706 | 11.769 | 13.280 |
| f1 | 4.084 | 4.919 | 3.740 | 4.944 | 4.870 | 4.388 | 5.512 |
| f2 | −7.292 | −8.127 | −10.282 | −5.531 | −7.852 | −7.730 | −5.876 |
| f3 | −8.258 | −10.929 | −5.962 | −23.359 | −15.278 | −7.595 | −26.559 |
| f4 | 30.581 | 24.863 | 58.881 | 17.588 | 41.273 | 20.487 | 20.036 |
| f12 | 7.975 | 9.447 | 5.922 | 13.954 | 9.484 | 7.883 | 17.292 |
| TTL | 11.040 | 11.050 | 11.040 | 11.051 | 11.051 | 10.546 | 12.629 |
| FOV | 19.50° | 19.50° | 19.50° | 19.60° | 19.60° | 19.50° | 17.07° |
| IH | 2.040 | 2.040 | 2.040 | 2.040 | 2.040 | 2.040 | 2.040 |
| FNO | 3.47 | 3.46 | 3.47 | 3.44 | 3.44 | 3.46 | 3.906 |
| f12/f | 0.68 | 0.80 | 0.50 | 1.19 | 0.81 | 0.67 | 1.30 |
| f4/f | 2.60 | 2.11 | 4.99 | 1.50 | 3.53 | 1.74 | 1.51 |
| R2/R1 | −1.47 | −4.41 | −1.21 | −9.99 | −5.46 | −4.80 | −3.40 |

Those of ordinary skill in the art may understand that the above are specific embodiments of the present disclosure. In practice, the embodiments may be varied in terms of form and details without departing from the spirit and scope of the present disclosure.

What is claimed is:

1. A camera optical lens consisting of four lenses with refractive power, from an object side to an image side:
a first lens having a positive refractive power;
a second lens having a negative refractive power;
a third lens having a negative refractive power; and
a fourth lens having a positive refractive power;
wherein the camera optical lens satisfies following conditions:

$$0.50 \leq f12/f \leq 1.20;$$

$$1.50 \leq f4/f \leq 5.00; \text{ and}$$

$$-10.00 \leq R2/R1 \leq -1.20;$$

where
f12 denotes a combined focal length of the first lens and the second lens,
f denotes a focal length of the camera optical lens,
f4 denotes a focal length of the fourth lens,
R2 denotes a central curvature radius of an image-side surface of the first lens, and
R1 denotes a central curvature radius of an object-side surface of the first lens.

2. The camera optical lens according to claim 1 further satisfying the following condition:

$$-2.00 \leq f3/f \leq -0.50;$$

where
f3 denotes a focal length of the third lens.

3. The camera optical lens according to claim 1 further satisfying the following condition:

$$1.00 \leq d4/d5 \leq 5.00;$$

where
d4 denotes an on-axis distance from an image-side surface of the second lens to an object-side surface of the third lens, and
d5 denotes an on-axis thickness of the third lens.

4. The camera optical lens according to claim 1 further satisfying the following condition:

$$(R7+R8)/(R7-R8) \leq -2.00;$$

where
R7 denotes a central curvature radius of an object-side surface of the fourth lens, and
R8 denotes a central curvature radius of an image-side surface of the fourth lens.

5. The camera optical lens according to claim 1 further satisfying the following conditions:

$$0.16 \leq f1/f \leq 0.63; \text{ and}$$

$$0.06 \leq d1/TTL \leq 0.24;$$

where
an object-side surface of the first lens close to an axis is convex and an image-side surface of the first lens close to the axis is convex,
f1 denotes a focal length of the first lens,
d1 denotes an on-axis thickness of the first lens, and
TTL denotes a total optical length from an object-side surface of the first lens to an image surface of the camera optical lens along an optical axis.

6. The camera optical lens according to claim 1 further satisfying the following conditions:

$$-1.74 \leq f2/f \leq -0.32;$$

$$-5.95 \leq (R3+R4)/(R3-R4) \leq 1.33; \text{ and}$$

$$0.02 \leq d3/TTL \leq 0.14;$$

where
an object-side surface of the second lens close to an axis is concave,
f2 denotes a focal length of the second lens,
R3 denotes a central curvature radius of the object-side surface of the second lens,
R4 denotes a central curvature radius of an image-side surface of the second lens,
D3 denotes an on-axis thickness of the second lens, and
TTL denotes a total optical length from an object-side surface of the first lens to an image surface of the camera optical lens along an optical axis.

7. The camera optical lens according to claim 1 further satisfying the following conditions:

$$-3.62 \leq (R5+R6)/(R5-R6) \leq 4.97; \text{ and}$$

$$0.02 \leq d5/TTL \leq 0.14;$$

where
R5 denotes a central curvature radius of an object-side surface of the third lens,
R6 denotes a central curvature radius of an image-side surface of the third lens, d5 denotes an on-axis thickness of the third lens, and TTL denotes a total optical length from an object-side surface of the first lens to an image surface of the camera optical lens along an optical axis.

8. The camera optical lens according to claim 1 further satisfying the following condition:

$$0.02 \leq d7/TTL \leq 0.16;$$

where an object-side surface of the fourth lens close to an axis is convex and an image-side surface of the fourth lens close to the axis is concave, d7 denotes an on-axis thickness of the fourth lens, and TTL denotes a total optical length from an object-side surface of the first lens to an image surface of the camera optical lens along an optical axis.

9. The camera optical lens according to claim 1 further satisfying the following conditions:

$$TTL/IH \leq 5.42; \text{ and}$$

$$f/IH \geq 5.70;$$

where

TTL denotes a total optical length from an object-side surface of the first lens to an image surface of the camera optical lens along an optical axis, and IH denotes an image height of the camera optical lens.

* * * * *